Figure 1:
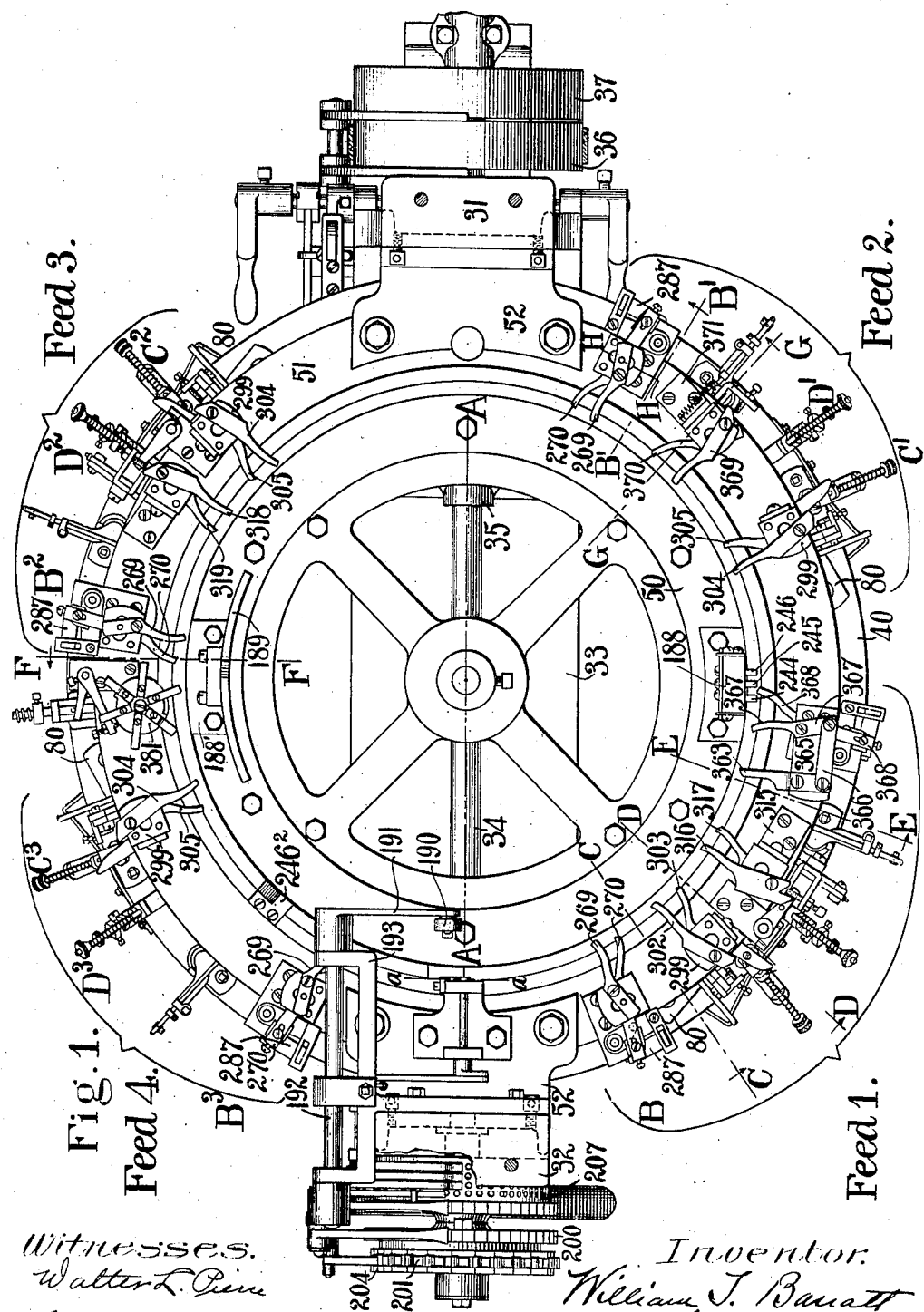

W. T. BARRATT.
CIRCULAR KNITTING MACHINE.
APPLICATION FILED AUG. 15, 1907.

917,989.

Patented Apr. 13, 1909.
14 SHEETS—SHEET 2.

W. T. BARRATT.
CIRCULAR KNITTING MACHINE.
APPLICATION FILED AUG. 15, 1907.
917,989.
Patented Apr. 13, 1909.
14 SHEETS—SHEET 3.
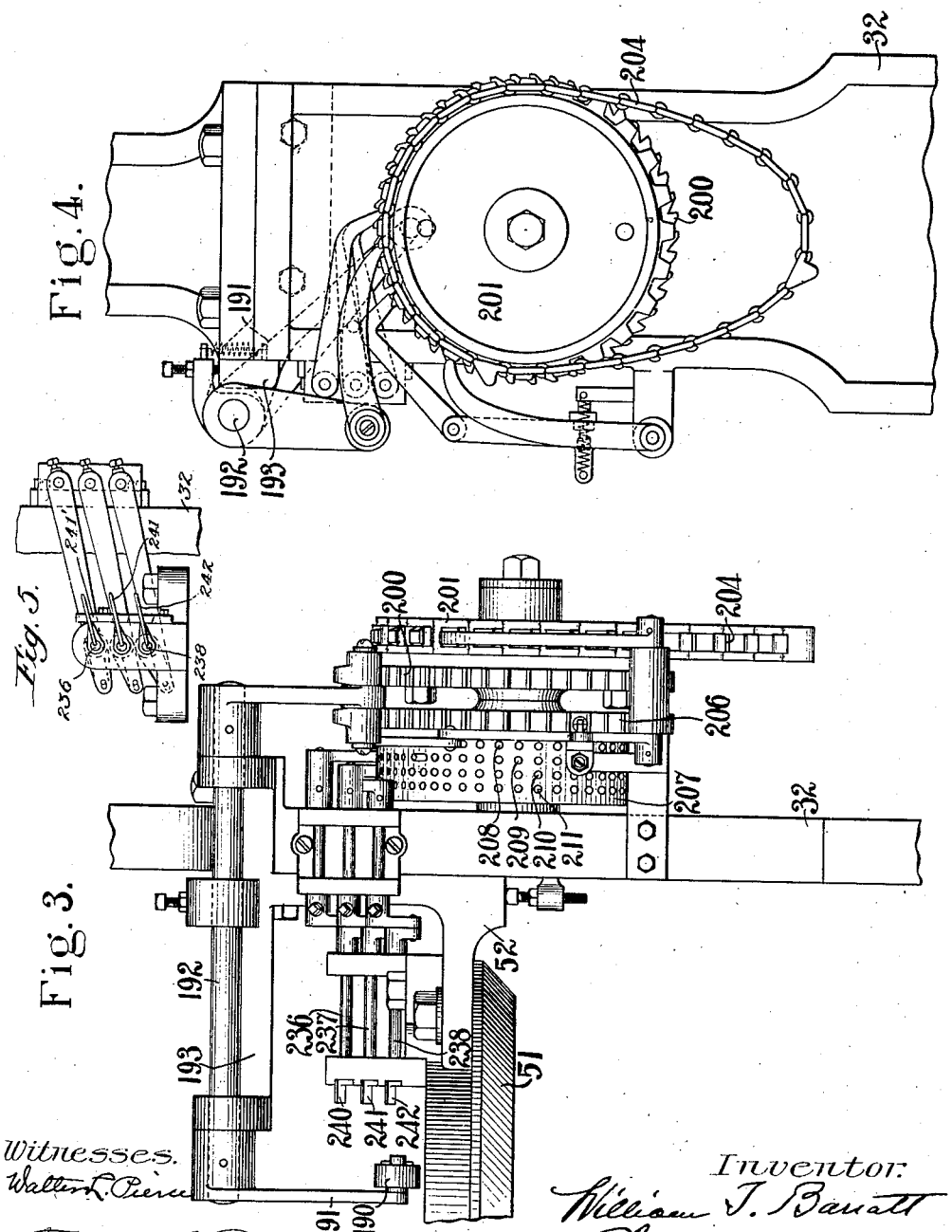

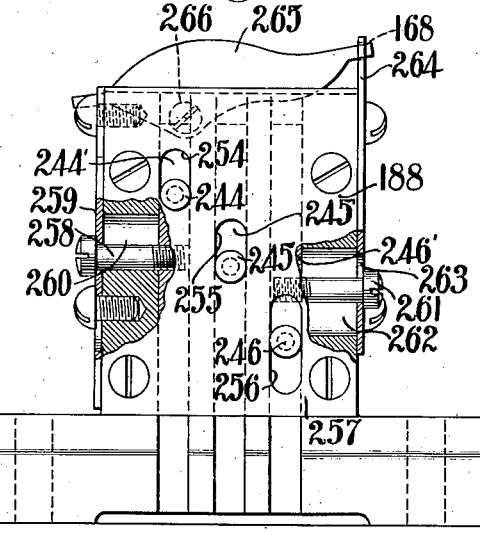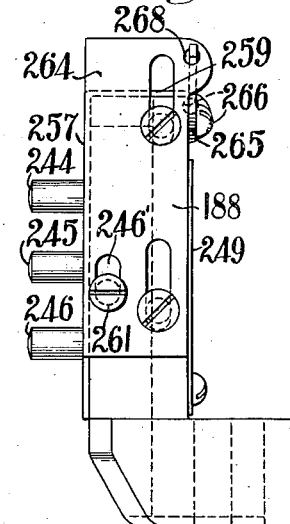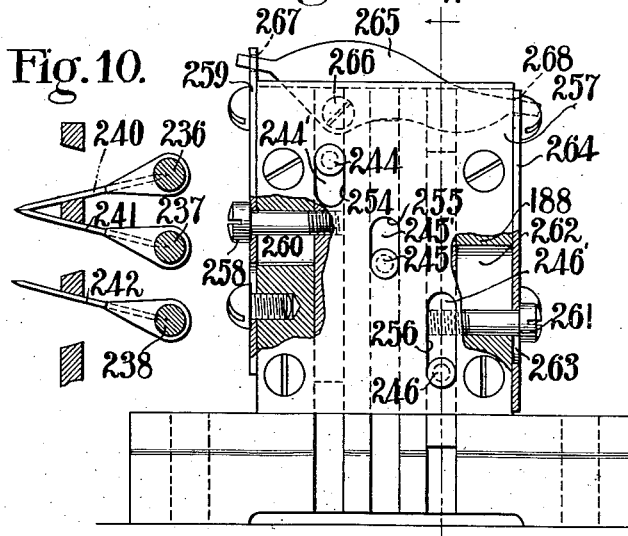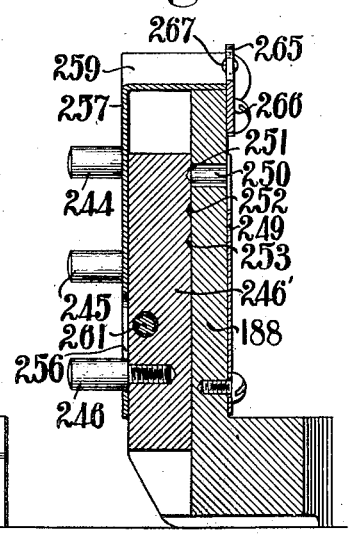

W. T. BARRATT.
CIRCULAR KNITTING MACHINE.
APPLICATION FILED AUG. 15, 1907.

917,989.

Patented Apr. 13, 1909.
14 SHEETS—SHEET 5.

Witnesses. Inventor:

W. T. BARRATT.
CIRCULAR KNITTING MACHINE.
APPLICATION FILED AUG. 15, 1907.

917,989.

Patented Apr. 13, 1909.
14 SHEETS—SHEET 7.

Witnesses.

Inventor:

W. T. BARRATT.
CIRCULAR KNITTING MACHINE.
APPLICATION FILED AUG. 15, 1907.

917,989.

Patented Apr. 13, 1909.
14 SHEETS—SHEET 8.

W. T. BARRATT.
CIRCULAR KNITTING MACHINE.
APPLICATION FILED AUG. 15, 1907.

917,989.

Patented Apr. 13, 1909.
14 SHEETS—SHEET 9.

Witnesses.
Walter L. Pierce
Francis H. Bishop

Inventor.
William T. Barratt,
by his attorney Charles N. Gooding.

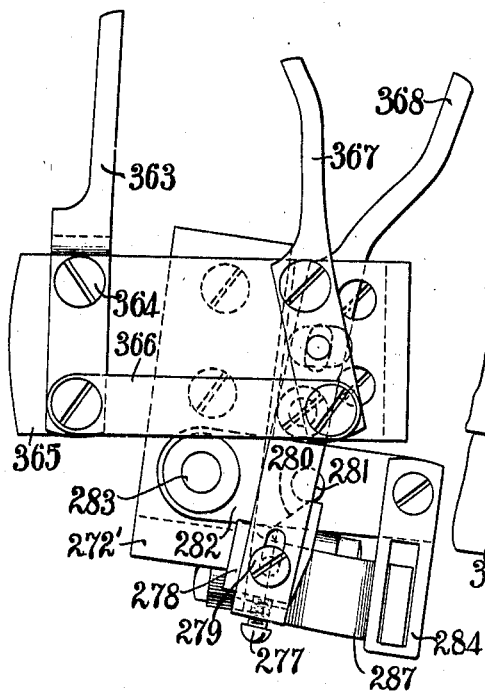
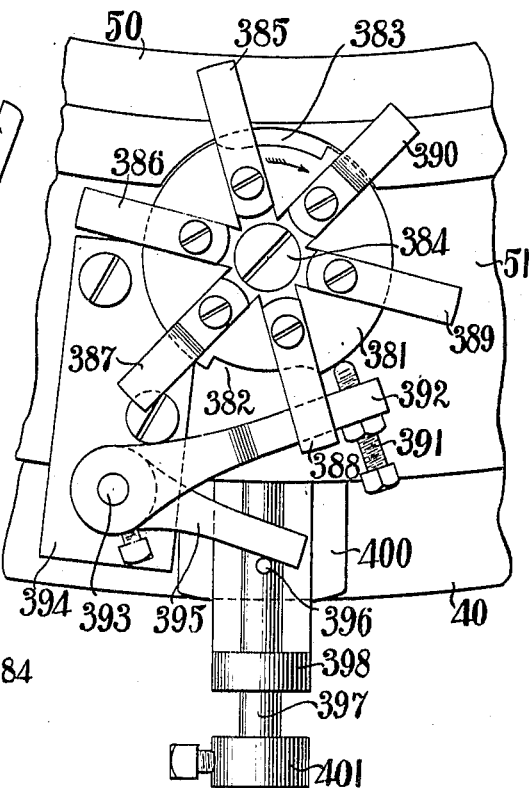
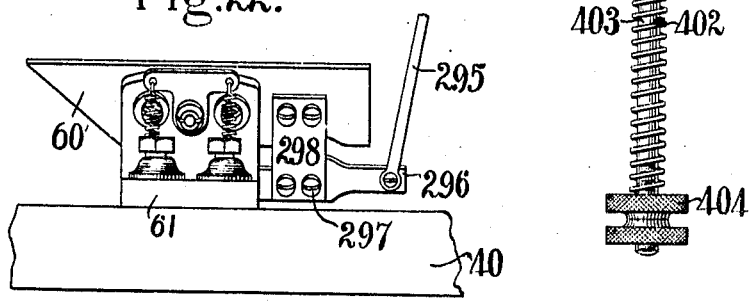

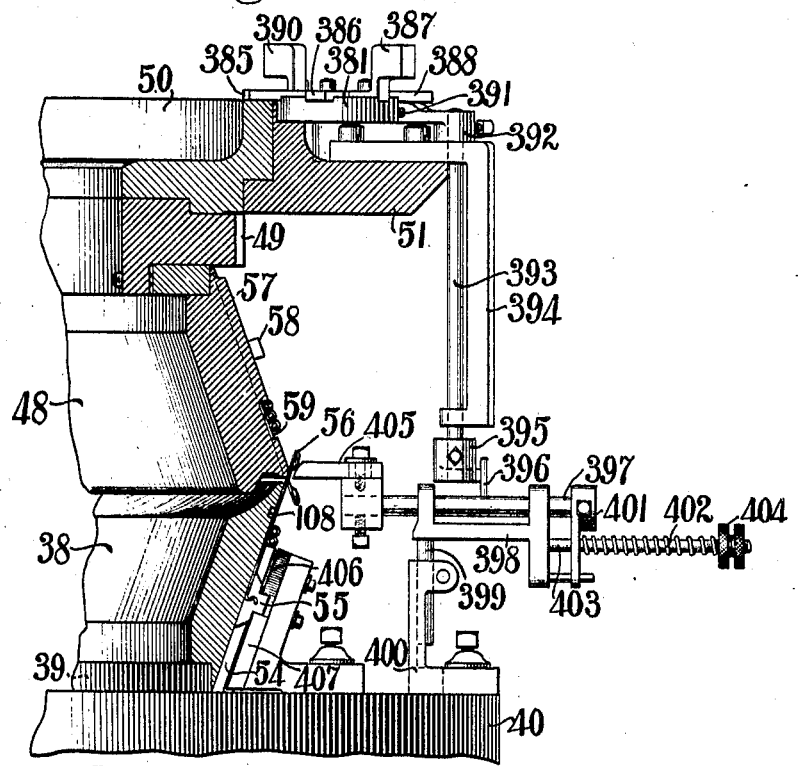
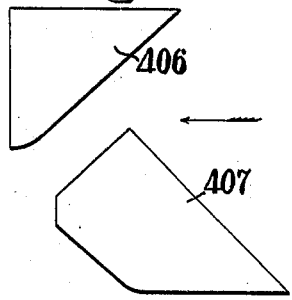
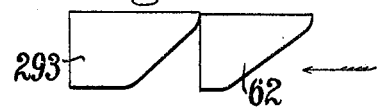
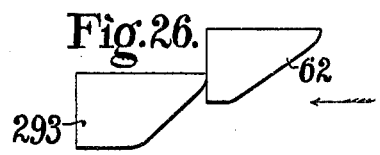

W. T. BARRATT.
CIRCULAR KNITTING MACHINE.
APPLICATION FILED AUG. 15, 1907.
917,989.
Patented Apr. 13, 1909
14 SHEETS—SHEET 12.
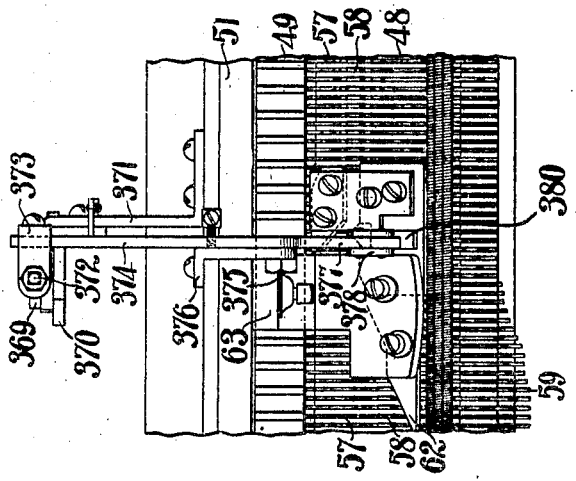
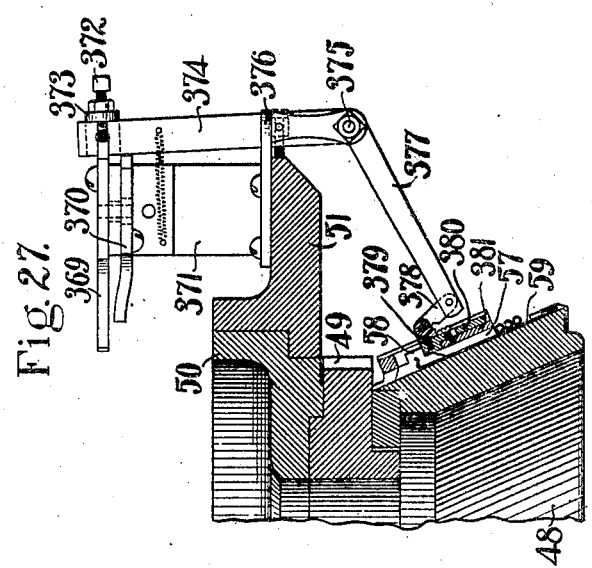
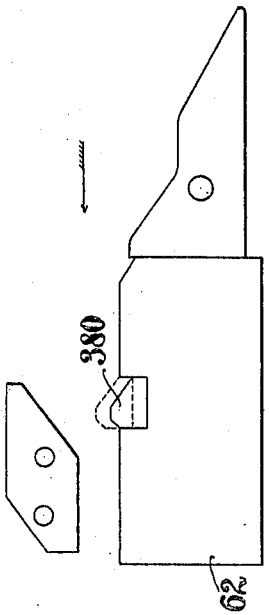
Witnesses.
Walter L. Pierce
Francis H. Bishop
Inventor.
William T. Barratt
by his attorney
Charles N. Goding

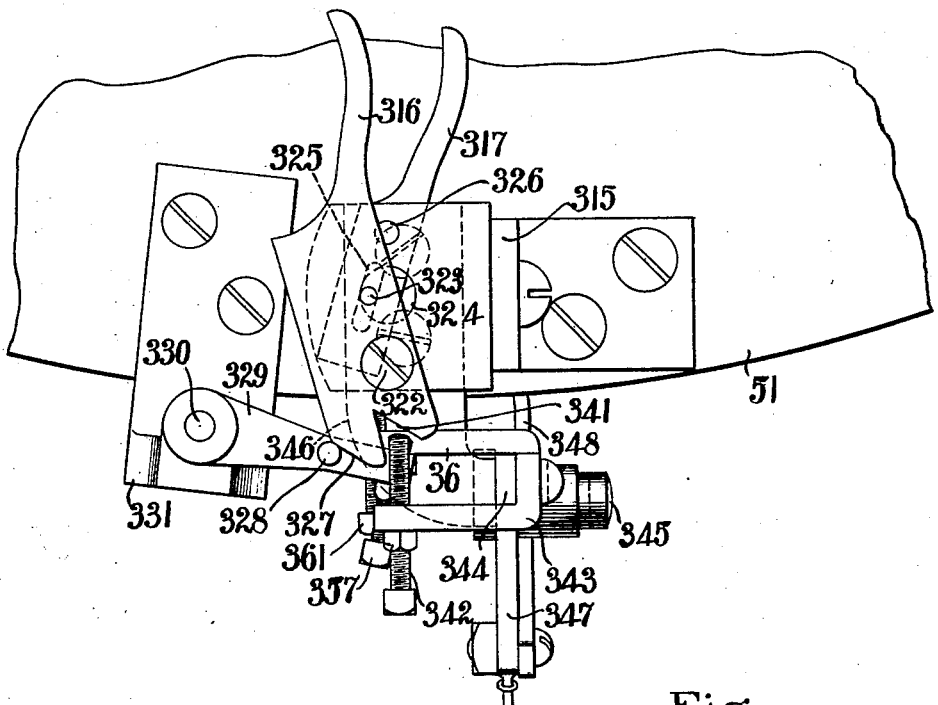
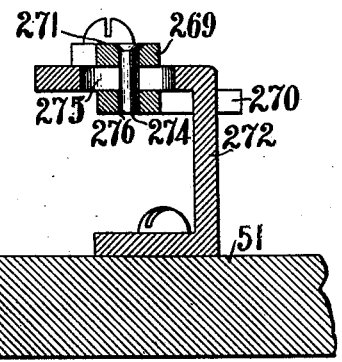
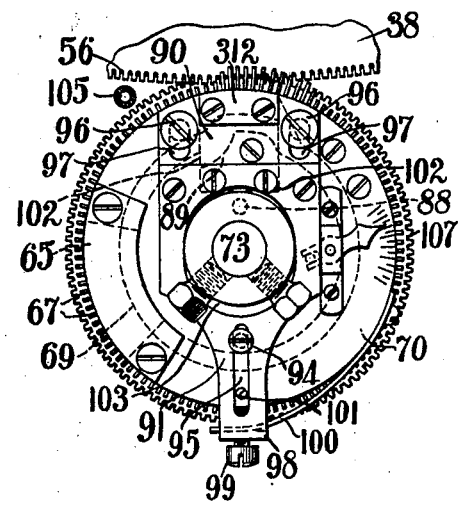

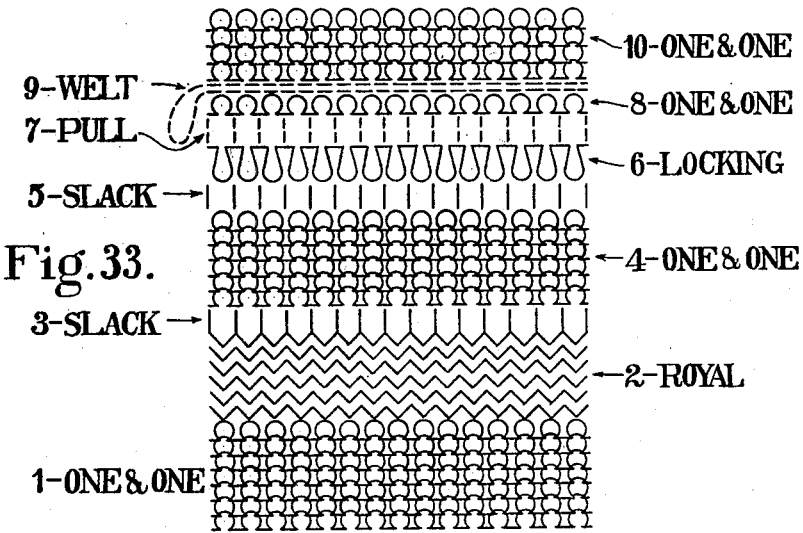
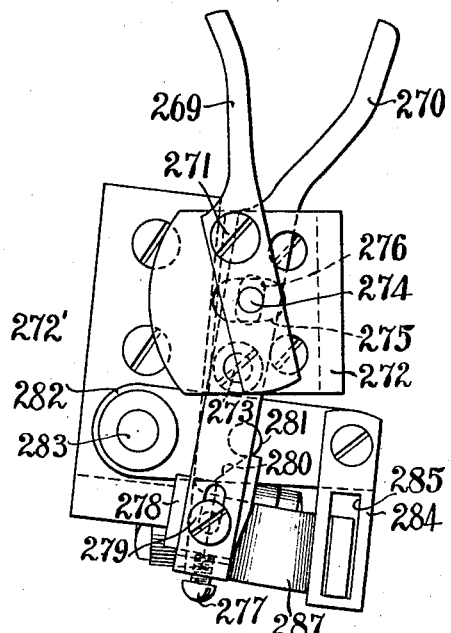

UNITED STATES PATENT OFFICE.

WILLIAM T. BARRATT, OF BENNINGTON, VERMONT, ASSIGNOR, BY MESNE ASSIGNMENTS, TO ANNIE COOPER, ALEXANDER J. COOPER, AND CHARLES S. KEHOE, EXECUTORS OF CHARLES COOPER, DECEASED.

CIRCULAR-KNITTING MACHINE.

No. 917,989.   Specification of Letters Patent.   Patented April 13, 1909.

Application filed August 15, 1907. Serial No. 388,580.

*To all whom it may concern:*

Be it known that I, WILLIAM T. BARRATT, a citizen of the United States, residing at Bennington, in the county of Bennington and State of Vermont, have invented new and useful Improvements in Circular-Knitting Machines, of which the following is a specification.

This invention relates to certain improvements in circular rib knitting machines, known as "rib top" machines and is of the same class machine as that set forth in U. S. Patent to Hurley No. 607,798, dated July 19, 1898. In the Hurley machine a string work of ribbed fabric was produced, one end of each section of the fabric terminating in a welt which was joined directly to the termination of the adjacent fabric which was of one-and-one rib, the object of the invention being to produce a welt which would serve as a finish to the ends of cuffs, drawer bottoms, bottoms of shirts, tops of socks, and such other purposes as desired. Said Hurley machine was capable of knitting a variety of stitches, such as "one-and-one" "royal," "tuck" and the like, but the different sections were joined directly to each other, *i. e.*, the one-and-one rib portion of the fabric was joined directly to the welt and in separating the different sections of the string work to form cuffs and the like, it was very difficult not to cut the stitches, either in the welt or in the one-and-one fabric and thus destroy a certain portion of the product of the machine.

This invention has for its object to produce a string work of ribbed fabric including one-and-one, royal, tuck and loose courses and to join the one-and-one rib of one end of a section of the fabric to the welt of the succeeding section by one or more courses of plain fabric, so that the sections may be separated one from another by cutting without any danger of injuring the one-and-one stitch or the welt, or, if preferred, the sections may be separated by withdrawing one course of the plain fabric joining the sections together. In order to secure this result, the machine of this invention is so constructed that after the rib work of different kinds, which constitutes a section of the rib fabric, has been finished on the machine, and which is adapted for cuffs and the like, a locking course is knitted on the primary needles; then one or more courses of one-and-one fabric are knit on both sets of needles; then both the old and new loops are cast off of the primary needles in a single feed while the secondary loops are held on the secondary needles; the tension of the take-up upon the fabric then causes the loops formed by the primary needles to ravel back to said locking course, leaving between the sections one or more courses, as many as may be desired, which can be cut to separate the sections one from the other, or said sections may be separated by removing, as hereinbefore set forth, a single course of the plain fabric, which is obtained by raveling, as described. It will be noted that after the one-and-one has raveled back to the locking course a single course of one-and-one is knit on both sets of needles and subsequently the action of the needles is changed to knit the welt of several plain courses; then continuing with the one-and-one to join the welt to the previous one-and-one, and then continuing with both sets of needles to knit another section of rib work.

In the Hurley machine, the mechanism was so constructed that when a loose course was knit it did not extend entirely around the fabric, but stopped short approximately the distance between two of the shipping pins. Another object of this invention is to so arrange and operate the shipping pins that the loose course will be knit entirely around the fabric.

In the Hurley machine, a rotary sinker wheel with fixed blades was used and co-operating therewith was a stitch former, whereby the different lengths of loop required for different styles of stitch were obtained. In the present machine I have combined with the stitch forming mechanism a sinker wheel having movable blades which are automatically operated to feed different lengths of loop between the needles, and which mechanism, combined with the mechanism for pressing the primary needles twice in the same feed, is embodied in this invention, said sinker wheel mechanism, however, forming, in itself, the subject matter of an application for Letters Patent made by me Serial No. 372,812, filed May 9, 1907. It will, furthermore, be understood that the machine of this invention is adapted to knit a fabric substantially like that set forth in another application made by me Serial No. 312,612, filed April 19, 1906.

The machine of this invention as particularly illustrated is arranged and constructed to knit the sections of fabric as follows: 1st, a one-and-one fabric; 2d, royal or tuck; 3d, a slack course; 4th, one-and-one; 5th, a slack course; 6th, a locking course; 7th, a single course of one-and-one, the loops of this one-and-one course being pressed off the primary needles and allowed to ravel back to the sixth or locking course; it being understood that any number of these one-and-one courses can be knit upon the machine and allowed to ravel back to the locking course by increasing the number of feeds. The present machine being shown with four feeds only allows one course of one-and-one to ravel back to the locking course. If, however, there were six feeds there could be three courses of one-and-one raveled back to the locking course. 8th, a single course of one-and-one; 9th, the action of the needles is changed to knit the welt of several plain courses; 10th, a one-and-one course joining the welt to the previous one-and-one course and continuing in the same order as hereinbefore set forth.

The different sections of fabric, after being separated one from the other, as hereinbefore described and which terminate in a welt, are used in cuffs, drawer bottoms, bottoms of shirts, tops of socks and the like.

The invention consists in certain improvements in mechanism inserted between two feeds, whereby the new loops are cast off the primary needles before the yarn for another loop is fed thereto—that is, the primary needles are pressed twice between two successive yarn feeding devices, so that the old loops and the new loops are cast off of the primary needles, and the loops drawn by the primary needles in the knitting of the one-and-one or regular fabric are thus allowed to ravel back to a locking course previously knit, the secondary loops being held upon the secondary needles, the resultant fabric being at this particular point the same as though a plain course or several plain courses were knit upon the secondary needles with the loops extending toward the finished face of the fabric.

The invention further consists in certain improvements in the operation of the shipping pins by means of which the different mechanisms for changing the throw of the sinkers the needle cams and the pressers are operated, and whereby a slack course may be knitted entirely around the circular fabric.

The invention finally consists in the combination and arrangement of parts set forth in the following specification and particularly pointed out in the claims thereof.

Figure 2:
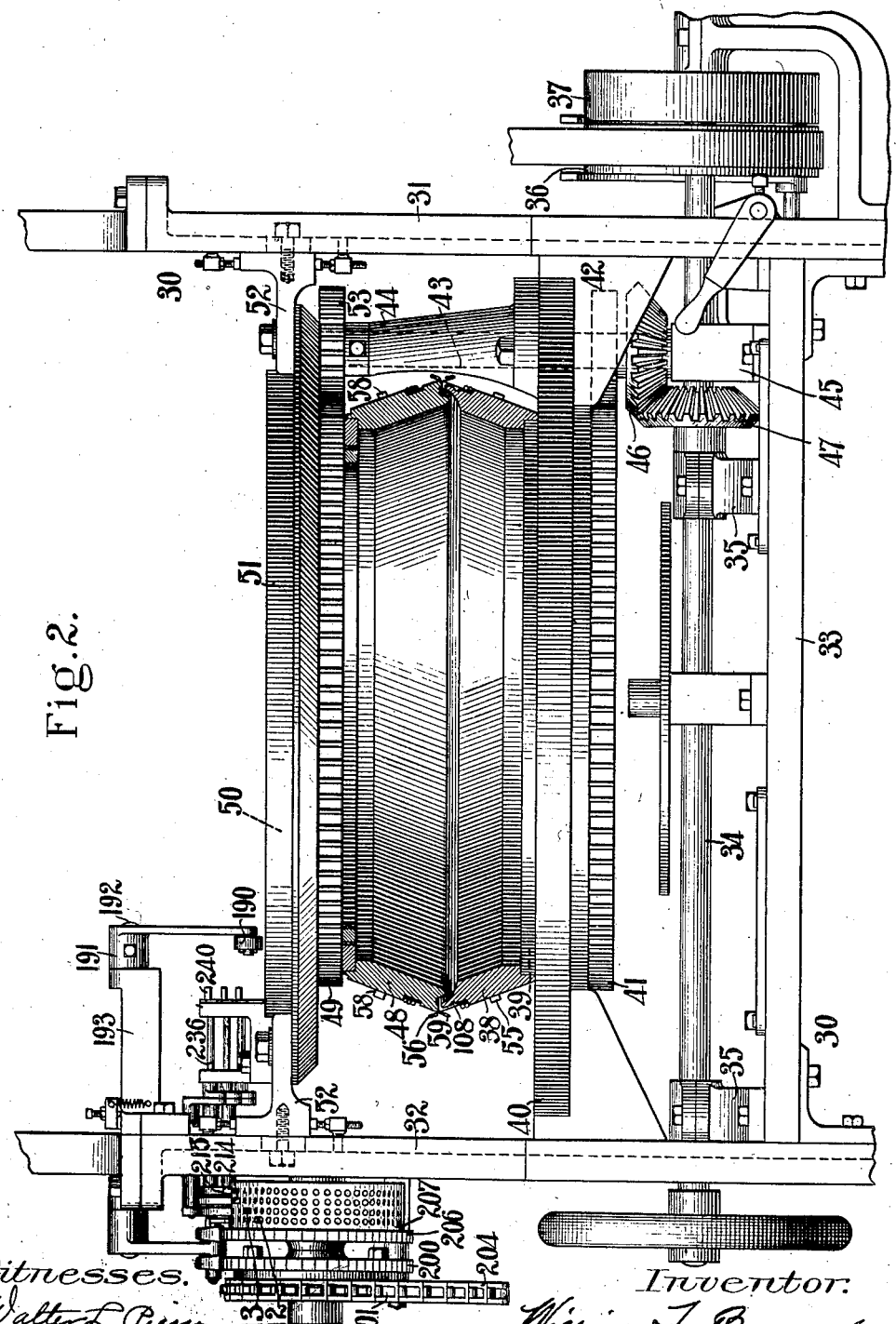
Figure 11:
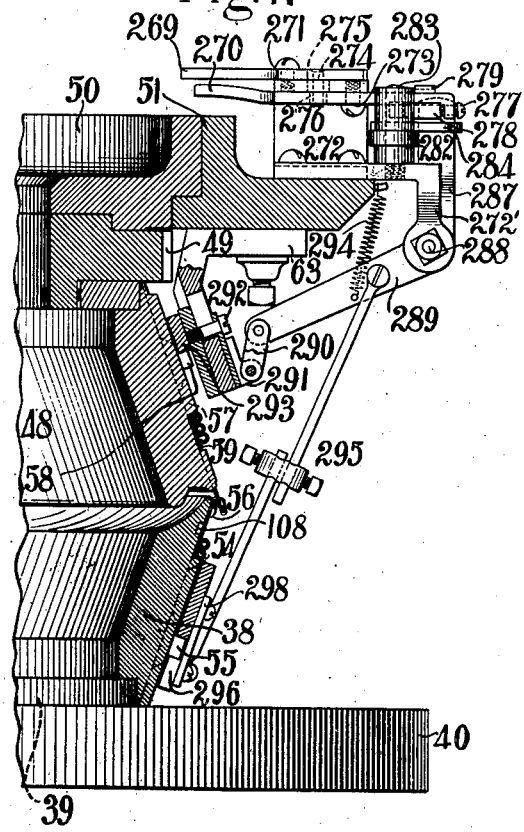
Figure 12:
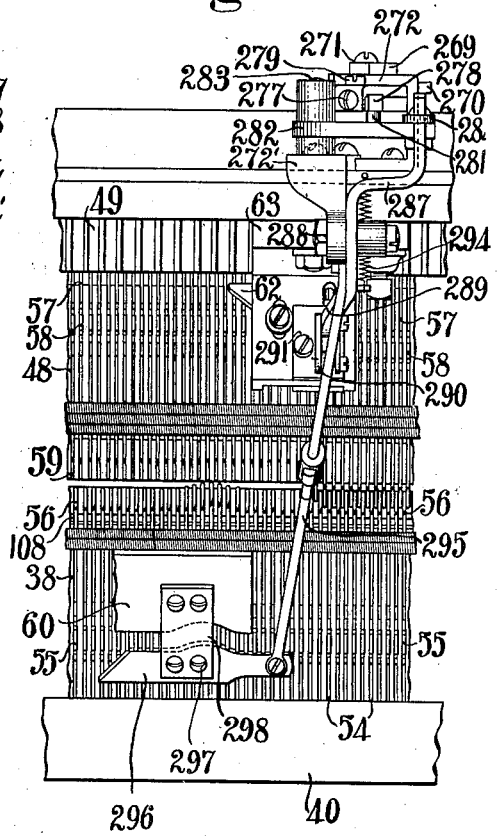
Figure 13:
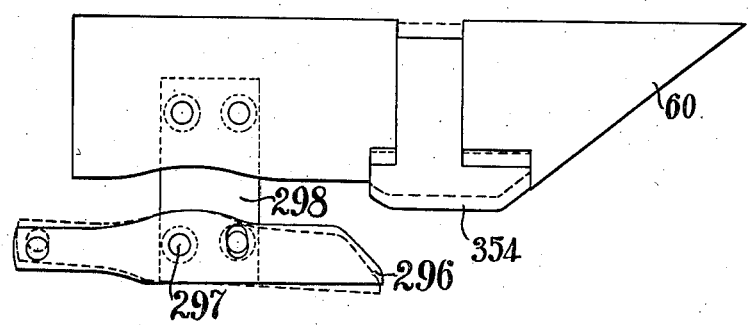
Figure 14:
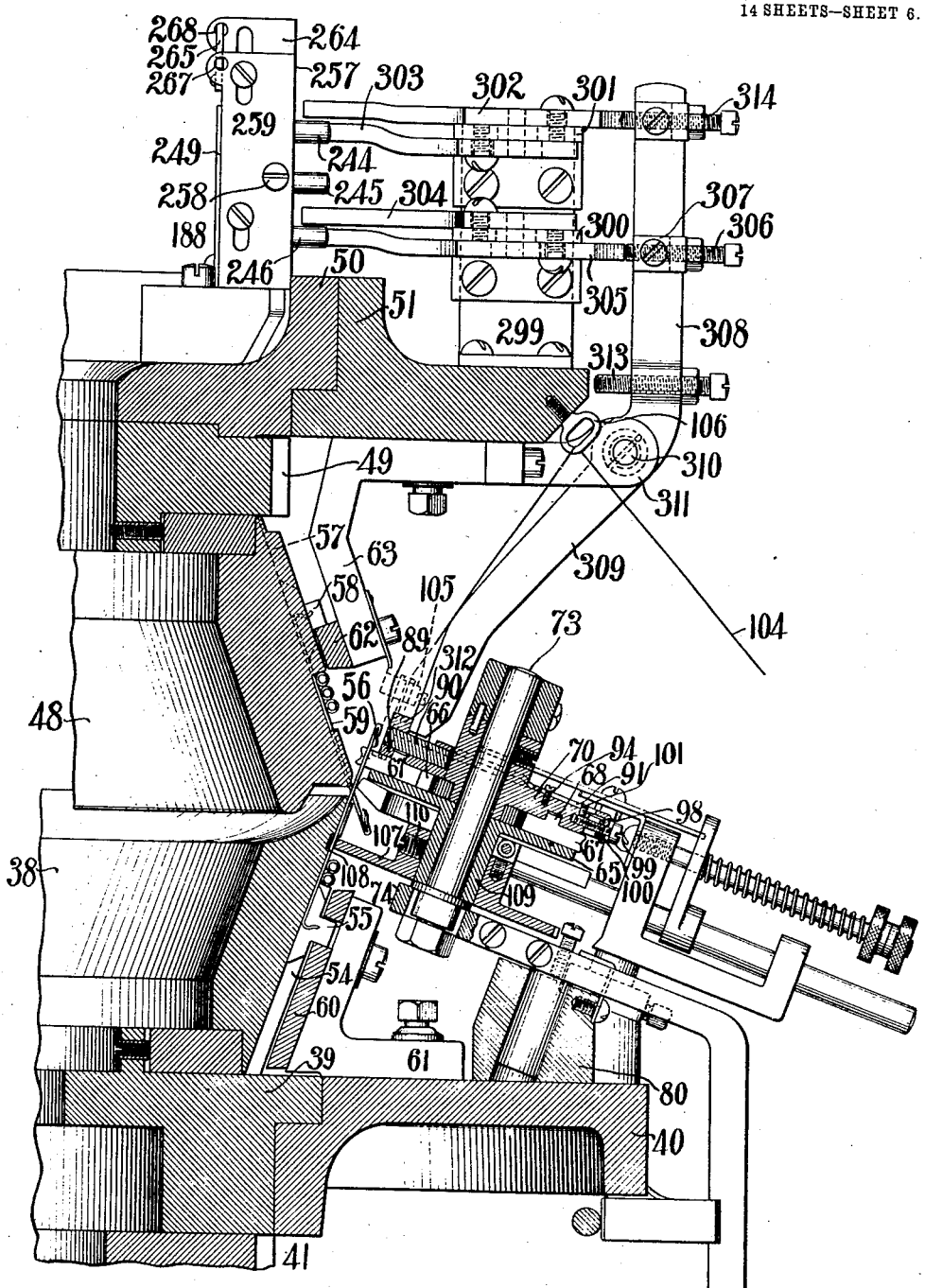
Figure 15:
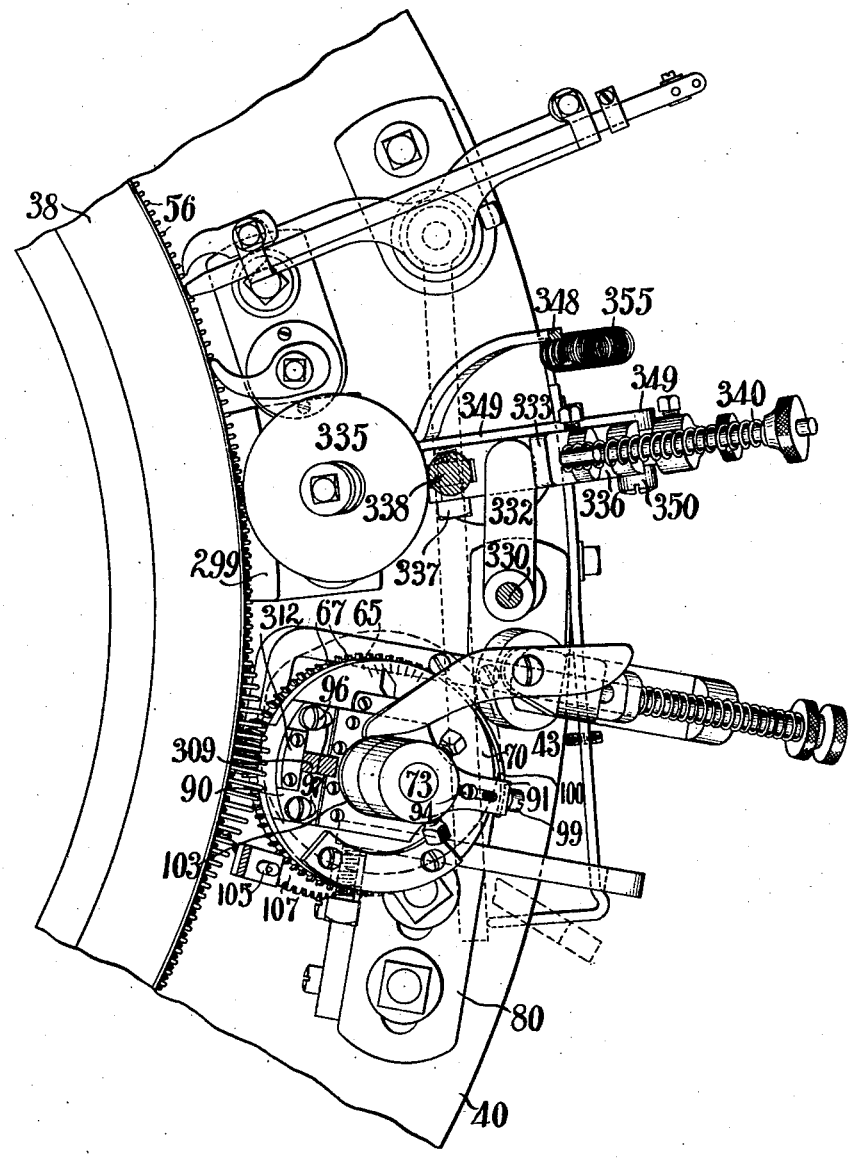
Figure 16:
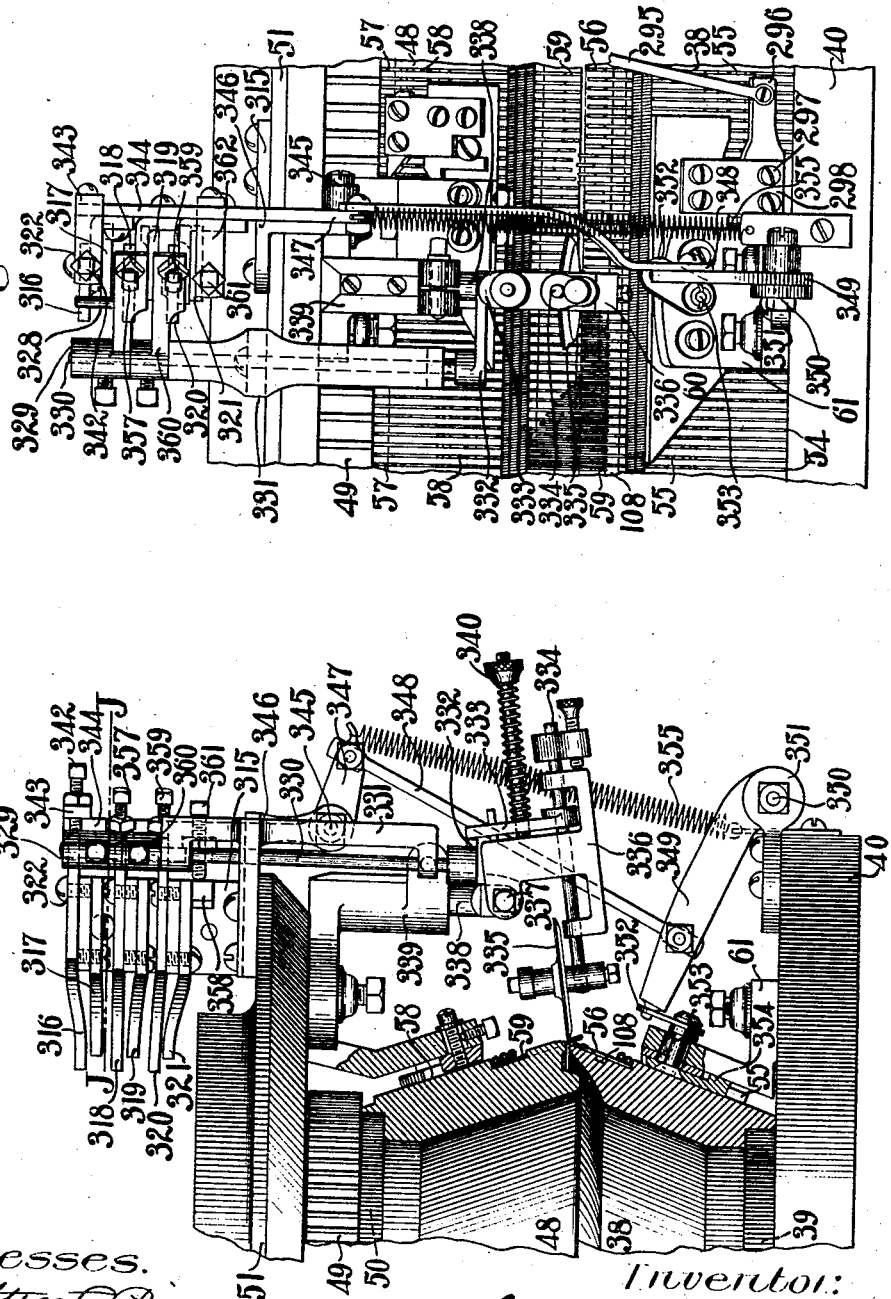
Figure 17:
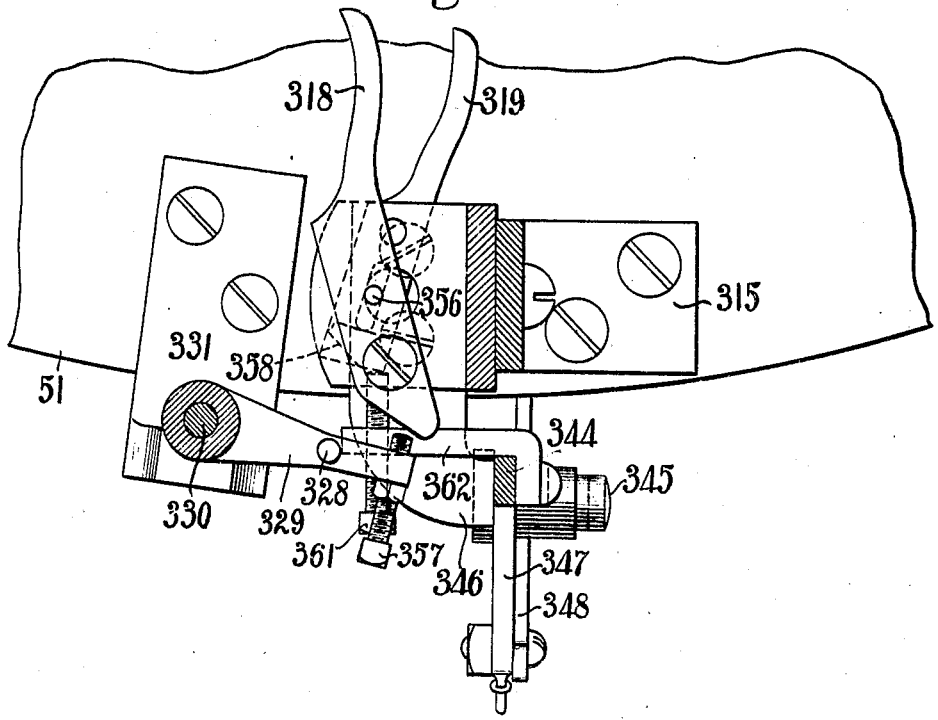
Figure 19:
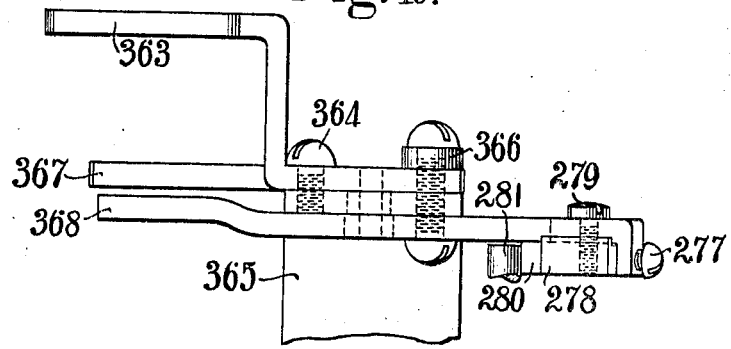

Referring to the drawings: Figure 1 is a plan view of my improved knitting machine, partly broken away for the sake of illustration and to save space, the upper portion of the machine which supports the tension mechanism being removed, the bolts by which said upper portion is secured to the lower portion of the frame being shown in section. Fig. 2 is a front elevation, also partly broken away to save space and with the needle cylinders shown in section on line A—A, Fig. 1. Fig. 3 is a rear elevation of the pattern wheels, switch plates and a portion of the upper bed-plate upon which the secondary needle cylinder rotates. Fig. 4 is a side elevation of the parts illustrated in Fig. 3 as viewed from the right thereof or as viewed from the left of Fig. 2. Fig. 5 is a side elevation of the switch-plates and the levers by means of which they are operated, together with their supporting stands and brackets, as viewed from the left of Fig. 3 or from the right of Fig. 2. Fig. 6 is a front elevation of the shipping pin stand, the same being partly broken away and shown in section, together with the different shipping pins and their connecting mechanism. Fig. 7 is a right hand side elevation of the shipping pin stand and shipping pins illustrated in Fig. 6. Fig. 8 is a front elevation, partly broken away and shown in section, similar to Fig. 6, with the shipping pins and connecting mechanism shown in a different position. Fig. 9 is a sectional elevation taken on line 11—11 Fig. 8, looking in the direction of the arrow on said line. Fig. 10 is a detail sectional elevation taken on line a—a, Fig. 1, looking toward the right in said figure, illustrating the switch-plates and stops therefor. Fig. 11 is a sectional elevation taken at B′—B′, Fig. 1, illustrating the mechanism for changing the position of the needle cams. Fig. 12 is a front elevation broken away to save space of the parts shown in Fig. 11. Fig. 13 is a rear elevation of the lower needle cam illustrated in Figs. 16 and 17. Fig. 14 is a sectional elevation taken on line C—C, Fig. 1, illustrating the sinker wheel, the presser for the primary needles, and mechanism for automatically changing the throw of the sinkers. Fig. 15 is a plan view, broken away to save space, illustrating the sinker wheel, the presser for the primary needles, the presser for the secondary needles, and the automatic stop mechanism. Fig. 16 is a sectional elevation taken on line D—D, Fig. 1, illustrating the presser for the secondary needles and the cams, together with mechanism for automatically changing the positions of the cams on the primary cylinder. Fig. 17 is a sectional plan taken on line J—J, Fig. 16. Fig. 18 is a front elevation of the parts illustrated in Fig. 16, the same being broken away to save space. Fig. 19 is a detail side elevation of the levers at E, Fig. 1, which are operated by the shipping pins to actuate the needle cams to change the stitch.

Fig. 20 is an enlarged detail plan of the levers and connecting mechanism at E, Fig. 1. Fig. 21 is an enlarged detail plan of the cam and connecting mechanism for throwing the auxiliary presser for the primary needles between the third and fourth feeds, Fig. 1. Fig. 22 is a detail front elevation of a cam for the primary needles used in the fourth feed. Fig. 23 is a sectional elevation taken at F—F, Fig. 1, illustrating the auxiliary presser for the primary needles and the mechanism by which it is operated. Figs. 24, 25 and 26 are diagrammatic illustrations of needle cams. Fig. 27 is a sectional elevation taken at G—G, Fig. 1, illustrating the mechanism for changing the position of a portion of the needle cam for the secondary needles. Fig. 28 is a front elevation of the parts illustrated in Fig. 27, the same being broken away to save space. Fig. 29 is a rear elevation in detail of the cam for the secondary needles illustrated in Figs. 27 and 28. Fig. 30 is an enlarged plan of the levers at D, Fig. 1. Fig. 31 is a sectional elevation taken at H—H, Fig. 1. Fig. 32 is a plan of the sinker wheel, slur cock and sinker cam, showing the same in connection with a portion of the primary needle cylinder and its needles, with the yarn guide shown in section in its relative position with relation thereto. Fig. 33 is a diagram view of the different stitches used in knitting the sections of fabric on the machine. Fig. 34 is a plan view of a pair of levers and a portion of the mechanism operated thereby for actuating the needle cams for the primary and secondary needles, as seen at B (Fig. 1).

Like numerals refer to like parts throughout the several views of the drawings.

In the drawings, 30 is the frame, consisting of side standards 31 and 32 suitably connected together by a cross-head 33. The main driving-shaft 34 is journaled to rotate in bearings 35, 35 fast to said cross-head 33 and is rotated by means of a fast pulley 37, a loose pulley 36 also being provided and adapted to rotate upon the main shaft 34 adjacent to the pulley 37. The lower cylinder 38 is fast to a running ring 39 rotatably supported upon the bed-plate 40. A gear 41 is fastened to the running ring 39 and is driven by a pinion 42 fast to a vertical shaft 43 journaled to rotate in bearings 44 and 45 and rotated by means of a bevel gear 46 fast to the lower end thereof and meshing into a bevel gear 47 fast to the main driving shaft 34. The upper cylinder 48 is fastened to a gear 49 which, in turn, is fastened to a running ring 50, said running ring being constructed to rotate in the upper bed-plate 51. The upper bed-plate 51 is adjustably fastened to brackets 52, 52 which, in turn, are adjustably supported upon and fastened to the side standards 31 and 32. The upper cylinder is rotated by means of the gear 49 which meshes into a pinion 53 fast to the vertical shaft 43.

The lower cylinder 38 is provided with grooves 54 in which are needle jacks 55 with spring needles 56 connected or fastened thereto. The upper cylinder 48 is provided with grooves 57 and in said grooves are located jacks 58 to which are attached needles 59. The yarn is fed first to the needles of the lower cylinder, and, therefore, said needles and the cylinder upon which they are adapted to slide will be hereinafter referred to as the "primary" needles and cylinder, while the upper cylinder and the needles supported thereon will be referred to as the "secondary" cylinder and needles, for the reason that the loops of yarn are fed to the needles of the upper cylinder by the needles of the lower cylinder.

A reciprocatory motion is imparted to the primary needles by needle cams 60 fast to brackets 61 which, in turn, are fastened to the bed-plate 40. A reciprocatory motion is imparted to the secondary needles by needle cams 62 fast to brackets 63 which brackets are fastened to the upper bed-plate 51. The rotation of the cylinders and the operation of the primary and secondary spring needles therein is well known to those skilled in the art and results from the rotation of the cylinders relatively to the stationary cams.

The sinker wheel 65 (Figs. 14, 15 and 32) has a series of grooves 66 in the upper face thereof, said grooves radiating from a common center and in these grooves are located sinkers 67, each of said sinkers being provided with a lug 68 which projects into a groove 69 formed in the under face of the cam plate 70. Said sinker wheel is rotatably mounted upon a stud 73 fast to a rocker-frame 74. The rocker-frame 74 is rotatably mounted on a base 80 fast to the lower bed-plate 40.

The slur cock 89, Fig. 32 by means of which the sinkers are moved inwardly and outwardly between the primary needles 56, consists, as a whole, of a cam block 90 and a slide plate 91 fast to said cam block and extending across the upper face of the sinker cam 70. The slide plate 91 is suitably guided upon the cam 70 by a screw 94 which projects through a slot 95 provided in the slide plate 91 and has screw-threaded engagement with the cam plate 70. Said slide plate is further guided by two screws 96, 96 which project through slots 97, 97 provided in the cam block 90, said screws having screw-threaded engagement with the cam plate 70. The front end of the slide plate 91 is bent downwardly at 98 and is forked to straddle a screw 99 which, in function, is both a stop screw and an adjusting screw for the slur cock 89.

A flat spring 100 is fastened at one end to the cam plate 70, the free end of said spring bearing against the inner face of the downwardly extending end 98 of the slide plate 91, so that said slide plate 91 and the slur cock as a whole, including said cam plate and the cam block 90 fast thereto, are held against the stop-screw 99, and if it is desired to adjust said slur cock, so that its position farthest removed from the primary needles shall be diminished or increased, the stop-screw 99 is rotated toward the right or toward the left, respectively. After such adjustment has been performed, the screw 99 is held in position against accidental displacement by means of a set-screw 101. The cam block 90 and slide plate 91, forming as a whole the slur cock 89, are further guided, on being adjusted as hereinbefore described, by the slot or opening 102 which is formed in the cam plate 70 and extends therethrough (see Fig. 32), the cam block 90 projecting downwardly into said opening and fitting therein. The slide plate 91 has an opening or slot 103 therein which surrounds the hub of the cam plate 70 and thus enables said slide plate, with the cam block attached thereto, to be moved across the upper face of the cam plate 70 by rotating the adjusting screw 99 as hereinbefore described.

The yarn 104 is guided to the sinkers 67 by yarn guides 105 and 106, the yarn guide 105 being fastened to the cam bracket 63, while the yarn guide 106 is fastened to the upper bed-plate 51, Fig. 14. A gear 107 meshes into the primary needles 56 and projects into an annular groove 108 provided in the periphery of the primary cylinder 38. Said gear is fastened to a hub 109 projecting downwardly from the sinker wheel 65, by means of a set screw 110.

The detail construction of the sinker wheel and its supporting rocker frame, together with the means by which said sinker wheel is thrown out of engagement with the needles and held in yielding engagement therewith are all clearly set forth in a co-pending application by applicant, Serial No. 372,812, filed May 9, 1907.

It will be understood that there is a tripping mechanism and a stop motion mechanism to actuate the same for each feed. Said stop motion mechanism may be substantially the same as that illustrated and described in a co-pending application made by me Serial No. 408,515.

In a machine of the character set forth, it is necessary, in order to knit the different stitches and kinds of fabric referred to that the needle cams, pressers and slur cock shall be automatically changed to vary the throw of the needles, the pressing of the needle beards, and the length of loops fed to the needles. To accomplish these ends different series of levers and mechanism are employed on the machine which change the needle cams, the pressers, and the slur cock for the sinkers to secure the desired stitch and fabric. These different series of levers are operated by means of two pattern wheels and these pattern wheels, together with the mechanism actuated thereby and the different series of levers for actuating the needle cams, slur cock for the sinker wheel, the rotary presser for the secondary needles and the mechanism for pressing off the new loops as well as the old loops from the primary needles between two successive yarn feeding devices to allow the loops to ravel back to the locking course, while the secondary loops are being held upon the secondary needles, I will now proceed to describe.

Referring to Figs. 1 to 9 and 14 it will be seen that the running ring 50, to which the secondary cylinder and the gear 49 are fastened, has a stand 188' fastened thereto. A cam 189 is fastened to the inside of said stand and revolves with the secondary cylinder. At each revolution of the secondary cylinder 48, the cam 189 comes in contact with a friction roll 190 rotatably mounted upon an arm 191, Fig. 3, which is fastened to a rock-shaft 192 journaled to rock in bearings formed in a bracket 193 which is fastened to the side frame standard 32, and this rocking of the shaft 192 actuates a pattern chain mechanism similar to that illustrated and described in Hurley No. 607,798, July 19, 1898, and embodying pattern wheels 201 and 207, a pattern chain 204, ratchets 200 and 206, pins 212, 213, 214 and 215 inserted in holes 208, 209, 210 and 211 and switch plates 240, 241 and 242 fast to rock-shafts 236, 237 and 238, respectively.

The stand 188, Figs. 6 to 9 which revolves with the upper cylinder, has three shipping pins 244, 245 and 246 supported thereon for operating on and changing the levers for producing the different stitches in making the various kinds of work on the machine. The pins 244, 245 and 246 are each fastened, respectively, to a slide 244', 245' and 246', these slides being arranged to move in suitable ways provided in the shipping stand 188. The pins 244, 245 and 246 are adapted to be respectively engaged by the switch-plates 240, 241 and 242, and these plates being inclined, said pins will be moved positively up or down according to the direction of the inclination of the plates, and such inclination will be changed by the axial turning of the shafts 236, 237 and 238, respectively, so that the three pins may be moved into or out of operative position to accomplish the purposes hereinafter described.

Each of the slides 244', 245' and 246' is held in its raised or depressed position by a flat spring 249 fast to the stand 188, and having a pin 250 fast thereto. The slide 246' is provided with three depressions 251, 252 and 253 in its rear face (Fig. 9) into which a pin 250 is forced by means of a spring 249 when said slide is moved to bring one of said depressions in alinement with said pin, and thus said slide is held, together with the shipping pin 246, firmly in the position into which it may be moved as hereinafter described. When the pin 246 is in its middle position, as illustrated in Fig. 6, the pin 250 will project into the middle depression 252 upon the slide 246'; when the pin is in its lowermost position the pin 250 will project into the upper depression 251 and when the pin 246 is in its uppermost position the pin 250 will project into the lowermost depression 253. Thus said slide will be held in position. The pin 246 is moved from its lowermost position to its middle position by a cam 246² which is fastened to the upper bed-plate 51 and projects into the path of said shipping pin 246 as it rotates with the secondary cylinder (see Fig. 1).

The slides 244' and 245' are held in position by similar springs with pins attached thereto which project in each case into one of two depressions formed in the rear face of said slides, thus holding the pins 244 and 245 either in their uppermost or lowermost positions, respectively. The pins 244, 245 and 246 project through slots 254, 255 and 256, respectively, in the front plate 257 of the shipping stand. The slide 244' is connected by a screw 258 to a slide plate 259 which is guided by screws to slide upon the left hand side (Fig. 6) of the shipping stand. The screw 258 passes through a slot 260 provided in the shipping stand. Another screw 261 is fastened to the slide 246', said screw projecting through a slot 262 provided in the shipping stand and said screw also projecting through a slot 263 provided in a plate 264 which is adapted to slide on the right hand end (Fig. 6) of said shipping stand. A lever 265 is pivoted at 266 to the shipping stand 188. The opposite ends of said lever are reduced in width and project respectively through holes 267 and 268 provided in the slide plates 259 and 264. The distance from the center of the pivot 266 to the slide plate 259 is about one-half the distance from the center of said pivot to the slide plate 264, so that when the slide plate 259 is pushed up a certain distance in one direction, the slide plate 264 will move substantially twice said distance in the opposite direction.

It will be understood that the slots 254, 255 and 256 are out of alinement with each other and that the pins in said slots are also necessarily out of lateral alinement with each other. When the pins are in the position illustrated in Fig. 6 they are then at the proper location and height to do regular work—that is, the pin 244 is at the bottom of its slot and the pin 245 at the bottom of its slot, the pin 246 being in the middle of its slot. The pin 244 is moved to the upper extremity of its slot in order to bring the same in contact with certain levers for changing the stitch from the regular work to that of the slack course; the shipping pin 245 is adjusted to the upper extremity of its slot for the purpose of bringing said pin 245 in contact with certain levers for changing the stitch from the regular work to that of the "royal rib;" and the shipping pin 246 is adjusted to the upper part of its slot for the purpose of bringing said pin in line with certain other levers for the purpose of changing the stitch from the regular work to that of making the "welt." Said pin 246 is moved to the lower part of its slot for the purpose of rotating a cam which is connected by certain mechanism, hereinafter described, to an auxiliary presser to press the beards of the primary needles a second time between two successive feeds, for the purpose of casting off the new as well as the old loops from said primary needles and allowing the yarn to ravel back to the locking course. As will be seen in Fig. 1 the different sets of mechanism for operating the stitch-feeding devices, pressers and needle cams are arranged in four groups or feeds, as indicated in said figure, feed 1, feed 2, feed 3 and feed 4, there being located between feeds 3 and 4 a cam and mechanism for operating an auxiliary presser which presses the beards of the primary needles a second time between two successive stitch feeding devices.

The series of levers upon which the shipping pins are made to operate at such times as may be desired to change the stitch during the rotation of the needle cylinders are arranged at different points on the upper bed-plate 51 (Fig. 1). These levers are arranged in pairs and are all constructed and operated substantially on the same plan.

The mechanism for operating the needle cams for the primary and secondary needles is the same in each of the feeds Nos. 2, 3 and 4, and each of said mechanisms is located at B', B² and B³, respectively, in said feeds. Therefore, the following description of the mechanism at B' will apply equally to B² and B³. Referring now to Figs. 1, 11, 12, 25, 26, 31 and 34 it will be seen that 269 and 270 form one of these pairs of levers, hereinbefore referred to, the upper lever 269 being pivoted at 271 to a bracket 272 fastened to the upper bed-plate 51. The lever 270 is pivoted at 273 to said bracket and between the pivots 271 and 273 is a pin 274 which is fastened to the upper lever 269 and projects downwardly through a slot 275 in the bracket 272 into a slot 276 formed in the lower lever 270 and extending longitudinally thereof. The lever 270 is bent downwardly at its outer end to receive an adjusting screw 277 which bears at its inner end against a plate 278 which is adjustably fastened, by means of a screw 279 to said lever 270, the inner end of said plate 278 having a beveled face 280, as seen in Fig. 34. The inner end of the plate 278 bears against a pin 281 which is fastened to a lever 282 pivoted at 283 to a bracket 272'. The free end of said lever 282 has a plate 284 fast thereto having a slot 285 extending therethrough into which the upper end of a lever 287 projects. The lever 287 is pivoted at 288 to the bracket 272' and has a downwardly projecting arm 289 which is connected by a link 290 to a slide 291 arranged to slide in the bracket 63 fast to the upper bed-plate 51.

The slide 291 has fastened thereto, by a screw 292, a cam plate 293 (Figs. 11, 12, 25 and 26) said cam plate forming a movable portion of the secondary needle cams 62. A spring 294 holds the vertical arm of the lever 287 outwardly from the bed-plate 51, thus holding the pin 281 in contact with the plate 278 upon the lever 270. An adjustable link 295 connects the arm 289 of the lever 287 to a tilting cam plate 296 which is pivoted at 297 to a plate 298 fastened to the primary needle cam 60.

The operation of the mechanism hereinbefore specifically described for operating the primary and secondary needle cams is as follows: Assuming the parts to be in the positions illustrated in the drawings—that is, with the cams in correct location to operate the primary and secondary needles to knit a regular or one-and-one stitch, the shipping pin 246 is moved from its central position (Fig. 6) to its uppermost position by its switch-plate and as said pin is carried by the secondary cylinder during its rotation past the levers 269 and 270 it will engage the lever 269 and rock the same upon its pivot 271 toward the right (Fig. 34) thus through the pin 274 rocking the lever 270 toward the left at its inner end (Fig. 34) and toward the right at its outer end in said figure, moving the plate 278 toward the right and allowing the pin 281 to move outwardly down the inclined surface 280, thus allowing the lever 282 to be rocked upon its pivot, the upper end of said lever 287 moving outwardly, thus moving the arm 289 upwardly and moving the cam block 293 from the position illustrated in Fig. 26 to that illustrated in Fig. 25, thus leaving the secondary needles raised and out of operative position to knit a welt, and rocking the tilting primary needle cam plate 296 to the correct location for the primary needles to knit a plain stitch or welt. The cam 293 is depressed by the lever 287, after the welt is made, to bring the secondary needles back into their operative position for the regular or rib work. The mechanism at B in feed 1 is for changing the upper needle cams in order to change the stitch from the regular to a welt and vice versa and is the same as that hereinbefore described at B' except that the connecting rod 295 to the primary needle tilting cam is omitted. When the welt is being knit with a plain stitch a short loop of yarn is fed to the primary needles only, and when the regular or one-and-one fabric is being knit a longer loop is fed to the needles, and when a slack course is being knit a longer loop still is fed to the needles. The length of these different loops which are fed to the needles is regulated by the position of the slur cock 89, and the position of said slur cock is automatically changed by mechanism which I will now proceed to describe.

Referring to Figs. 1, 14 and 15, it will be seen that a bracket 299 is fastened to the upper bed-plate 51. Said bracket has two slotted plates 300 and 301 rigidly fastened thereto, each of which supports a pair of levers similar in construction to the different pairs of levers hereinbefore described, the upper pair of levers consisting of an upper lever 302 and a lower lever 303, the lower pair of levers consisting of an upper lever 304 and a lower lever 305. In order to knit the regular course, said levers are in the position illustrated in Figs. 1 and 14, the lower lever 305 being in contact with a screw 306 which has screw-threaded engagement with a bracket 307 fast to the vertical arm 308 of a lever 309 which is pivoted at 310 to a bracket 311 fastened to the needle cam bracket 63. The lever 309 projects downwardly (Fig. 14) and engages at its lower end a block 312 fast to the cam block 90 which forms a portion of the slur cock 89. When the parts are in the position illustrated in Fig. 14 the machine is knitting regular work. When the shipping pin 246 is raised it will engage the upper lever 304 and reverse the position of the lever 305, disengaging the same from the screw 306 and allowing the lever 308 to move outwardly at the lower end thereof until the screw 313, which is also fastened to the lever 308, abuts against the upper bed-plate 51. The spring 100 (Fig. 32) moves the slur cock outwardly from the needles and keeps the block 312 pressed against the lower end of the lever 309. Thus it will be seen that when the welt is to be knitted, the shipping pin 246 will actuate the levers 304 and 305 and the lever 309 to move the slur cock into position where a short loop will be fed to the primary needles. When the slack course is being knit the shipping pin 244 is raised and engages the upper lever 302 (Fig. 15), moving the same at the front end of said lever toward the left (Fig. 1) to engage a screw 314 fast to the lever 309, moving the lower end of said lever toward the cylinders or to its most inward position, thus moving the slur cock to its innermost position and feeding the sinkers between the needles to their greatest depth to form loops of proper length for a slack course. The levers in Figs. 1 and 14 are shown in the position occupied thereby when the regular course is being knit upon the machine.

In feed 1 at C the levers hereinbefore described are as illustrated in Fig. 14; in feed 2 at C' the mechanism is the same as illustrated in Fig. 14 without the upper set of levers 302 and 303 and the plate 301, said upper pair of levers being only used where a slack course is knit, which is in the first feed. The levers for operating the sinkers at C² in feed 3 and at C³, feed 4, are the same as at C'—that is, the upper pair of levers shown in Fig. 14 is omitted. The mechanism at D in feed 1 is illustrated further in detail in Figs. 16, 18 and 30 and is connected by the mechanism which I will now proceed to describe to the presser for the secondary needles and the needle cam for the primary needles.

The mechanism at D in feed 1 is for operating the presser for the secondary needles and the primary needle cam and is illustrated in detail in Figs. 16, 17, 18 and 30. Referring to these figures, it will be seen that there is a bracket 315 fast to the bed-plate 51 and upon this bracket are pivotally supported three pairs of levers which operate in substantially the same manner as the pairs of levers hereinbefore described. The upper pair of levers 316 and 317 are operated for the slack course, the middle pair of levers 318 and 319 are operated for the royal rib, and the lower pair of levers 320 and 321 are operated for the welt. Considering first the upper pair of levers 316 and 317 and referring to Figs. 15, 16, 18 and 30 it will be seen that the lever 316 is pivoted at 322 to the bracket 315 and has a pin 323 fast thereto and projecting downwardly therefrom through a hole 324 in said bracket and into a slot 325 extending longitudinally of the lever 317. The lever 317 is pivoted at 326 to the bracket 315, so that when one of said levers is moved in one direction the other lever will move in the opposite direction. The lever 317 performs no function other than to move the lever 316, but the lever 316 at its outer end is beveled at 327 and bears against a pin 328 fast to an arm 329 which, in turn, is fast to a vertical shaft 330, which is journaled to rock in a bracket 331 fast to the upper bed-plate 51. The lower end of said rock-shaft 330 has fastened thereto an arm 332 which bears against an arm 333 fast to a rod 334 upon which is rotatably supported the presser 335 for the secondary needles. The shaft 334 is free to slide in a bracket 336 and this bracket is pivotally supported upon a bolt 337 by which it is clamped to a stud 338 fast to a bracket 339 which, in turn, is fast to the upper bed-plate 51. A spring 340 presses against the arm 333 and presses the rod 334 forward toward the needle cylinders, thus holding the presser 335 normally pressed against the secondary needles. When the lever 316 is rocked upon its pivot 322 by the shipping pin 244, the lever 317 is rocked into its secondary position and the inclined end 327 of the lever 316 rocks the arm 329 by means of the pin 328 and also the rock-shaft 330 in the proper direction to rock the arm 332 and through the arm 332 the arm 333, rod 334 and the presser 335 are moved outwardly, so that the presser is removed from contact with the secondary needles in making a slack course.

When making a regular one-and-one course the parts are in the position illustrated in Figs. 16 and 30, the presser then being in contact with the secondary needles. Simultaneously with this movement of the presser away from the secondary needles, the cam for the primary needles is moved to the proper position to operate said needles for the slack course by the incline 341 engaging the inner end of a screw 342 which is screwed into a bracket 343 fast to the upper end of a lever 344 which is pivoted at 345 to the bracket 346 which is fastened to the upper bed-plate 51. The horizontal arm 347 of said lever 344 is connected by a link 348 to a lever 349 pivoted at 350 to a bracket 351 fast to the lower bed-plate 40. The free end of the lever 349 engages an arm 352 which is fast to a stud 353, to the inner end of which is fastened a cam plate 354 adapted to engage and operate the primary needles. A spring 355 is connected at one end to the lower bed-plate 40 and at its upper end to the arm 347 of the lever 344. When the lever 316 is rocked, as hereinbefore described, from the position illustrated in Fig. 30 by its shipping pin 244 to its secondary position, the inclined surface 341 engages the screw 342, rocks the lever 344 upon its pivot 345, moves the arm 347 downwardly, rocking the arm 349 downwardly through the rod 348, thus rocking the arm 352 downwardly to move the primary needle cam 354 downwardly to actuate the primary needles to make a long throw downwardly to draw the loops for the slack course.

Fig. 17 illustrates the levers 318 and 319 which are operated in the making of the royal rib. Said levers 318 and 319 are pivoted to the bracket 315. Said levers operate in substantially the same manner as the other pairs of levers hereinbefore described, being connected one to the other by a pin 356. The outer end of the lever 318 is adapted, when rocked, to engage a screw 357 having screw-threaded engagement in the arm 329, so that when said lever 318 is rocked by its shipping pin 245 toward the right from the position in which it is illustrated in Fig. 17, the outer beveled end of said lever will engage the screw 357, rock the arm 329 and move the presser 335 away from the secondary needles in the making of the royal rib, the same as hereinbefore described in relation to the movement of said presser outwardly from the secondary needles in the making of the slack course. The lever 319 performs no function other than to reverse the position of the lever 318 when the shipping pin 245 engages said lever 319. The levers 320 and 321 are the same in plan as the levers 318 and 319. Said levers 320 and 321 are pivoted to the bracket 315 and connected together by a pin as in the other pairs of levers hereinbefore described, so that when the lever 320 is moved in one direction the lever 321 will be moved in the opposite direction and vice versa. The lever 320 is beveled at its outer end, the same as the lever 318 and is adapted, when rocked, to engage a screw 359 fast to an arm 360 which, in turn, is fast to the rock-shaft 330. The outer end 358 of the lever 321 is adapted to engage a screw 361 in a bracket 362 which bracket is fastened to the lever 344. When the lower pin 246 engages the lever 320 it will move it from the position shown in the drawings to its alternative position, thus rocking the lever 321 toward the left (Fig. 17) and moving said lever out of contact with the screw 361. At the same time the arm 360 will be rocked by the outer end of the lever 320 to move the presser away from the secondary needles, thus leaving the beards in condition for the welt, and upon the reversal of the movement of the levers 320 and 321 from the position last described to the position shown in the drawings the needle cam and presser will be returned to the position illustrated in Fig. 16 and the parts will be in proper location to knit the one-and-one or regular stitch. The light tension spring 355 is supplied for the purpose of accommodating varying conditions and lengths of yarn, thus keeping the tension on the yarn the same, whether the yarn is on one or both sets of needles, by reason of the movement of the primary needle cam under the action of the spring 355 drawing the primary needles downwardly against the tension of the yarn.

The mechanism hereinbefore described for actuating the secondary presser at D and the primary needle cam is repeated at D², except that the upper pair of levers 316, 317 used in the slack course is omitted, said mechanism operating in the third feed only for the welt and royal rib. At D' and D³ the rotary presser is used in connection with the secondary needles, but said pairs of levers and their connections to the presser and to the primary needle cams are omitted in the second and fourth feeds.

The mechanism at E in feed 1 is shown in detail side elevation in Fig. 19 and in plan in Fig. 20. Said mechanism is for operating the upper and lower needle cams and is the same as the mechanism shown in the second feed at B', except that an extra lever 363 is pivoted at 364 to a bracket 365 and the lever 363 is connected by a link 366 to the pair of levers 367 and 368, said levers operating to change the position of the primary and secondary needle cams as hereinbefore described with relation to the levers at B' which operate the mechanism illustrated in Figs. 11 and 12 by means of which the primary and secondary needle cams are operated in changing the stitch from one-and-one to the plain or welt. The extra lever 363 is offset upwardly as illustrated in Fig. 19 and is used at the end of the first feed only and is operated by the pin 246 at the end of the slack course. In the second feed, after a slack course has been knit in the first feed, it is necessary that the secondary needles should have a greater throw at a certain point in the operation of the machine in order to set the stitch and for this reason the mechanism illustrated in plan view at G (Fig. 1) feed 2 is provided. The mechanism illustrated at G, feed 2, is illustrated in detail in Figs. 27, 28 and 29 and consists of a pair of levers 369 and 370. The levers 369 and 370 are operated to move each other in the opposite direction as hereinbefore described in relation to the other pairs of levers by the shipping pin 244 following a slack course. As illustrated in the drawings, these levers are in position for the one-and-one or regular stitch. Said levers 369 and 370 are pivoted upon a bracket 371 which is fastened to the upper bed-plate 51 and are connected together by a pin, so that when the lever 369 is rocked at its inner end toward the right from the position which it occupies in Fig. 1, the outer end thereof engages a screw 372 fast to a bracket 373, said bracket being fastened to the upper end of a lever 374 pivoted at 375 to a bracket 376 fast to the upper bed-plate 51. The arm 377 of the lever 374 is connected by a link 378 to a slide 379 which has fastened thereto a cam piece 380 adapted to slide in the primary needle cam bracket 63 from the position shown in full lines to that shown in dotted lines (Fig. 29). The lever 374 being moved outwardly by the shipping pin 244 after a slack course has been knitted on the first feed moves the arm 377 upwardly, thus moving the slide 379 upwardly with the cam block 380 thereon from the position shown in full lines (Fig. 29) to that shown in dotted lines therein, it being understood that in Fig. 29 the needle cams are viewed from the inside of the cylinder looking outwardly.

Between the third and fourth feeds, after having knit a slack course, a locking course, (and in the present machine using four feeds,) a single row of one-and-one on the third feed the beards of the primary needles which have already been pressed once in the third feed to cast off the old loops of the one-and-one in the usual manner are again pressed to cast off the new loops from the primary needles to allow this course of one-and-one to ravel back to the locking course, so that the different sections of fabric knit on the machine may be separated, as hereinbefore described, and to secure this result the mechanism illustrated in plan view (Fig. 1) between feeds 3 and 4 at F is utilized, said mechanism being more clearly illustrated in enlarged detail views in Figs. 23 and 21 in which 381 is a cam having recesses 382 and 383 in its periphery. The cam 381 is journaled to rotate upon a stud 384 fast to the upper bed-plate 51 and has arms 385, 386, 387, 388, 389 and 390 fast to the upper face thereof and projecting radially therefrom. The arms 387 and 390 project upwardly at their outer ends out of alinement with the arms 385, 386 388 and 389, said arms 387 and 390 being at the same height above the cam 381 as the pin 246 when in its central position or when the machine is knitting one-and-one. When the pin 246 is in its lowermost position it will engage the arm 385 and rotate the cam one-sixth of a rotation; upon the next rotation of the cylinders it will engage the arm 386 and rotate the cam another one-sixth of a rotation in the direction of the arrow on said cam (Fig. 21). When the cam has been rotated through 120° from the position shown in the drawings the recess 383 will allow a screw 391 to drop into said recess 383.

The screw 391 is fast to an arm 392 which is fastened to a rock-shaft 393 journaled to rock in bearings provided in the bracket 394 which is fastened to the upper bed-plate 51. The lower end of the rock-shaft 393 has an arm 395 fast thereto which engages a pin 396 fast to a rod 397 adapted to slide in bearings in the bracket 398 which is fast to a shank 399, said shank being adjustably supported in a bracket 400 fast to the lower bed-plate 40. The rod 397 has an arm 401 fast thereto which is engaged by a spring 402, said spring encircling a rod 403 fast to the bracket 398, one end of the spring bearing against said arm 401 the other against a set-nut 404, so that the tendency of said spring 402 is to force the arm 401 toward the left (Fig. 23), thus tending to press the rod 397 toward the needle cylinders. The rod 397 has a presser 405 adjustably fastened thereto and adapted to press against the beards of the primary needles 56. It will, therefore, be seen that as the cam 381 is rotated by the pin 246 engaging the different arms upon said cam, the screw 391 will drop into the recesses 383 and 382 alternately, thus rocking the arm 392, the rock-shaft 393 and the arm 395, and thus allowing the rod 397 and presser 405 to be moved inwardly until the presser presses the beards of the primary needles to press off the new loops therefrom.

Cam plates 406 and 407 (Fig. 24) are supported upon a suitable bracket and are utilized to raise and lower the primary needles between the third and fourth feeds, thus giving them an extra movement to bring said needles in contact with the presser 405 for the extra pressing operation hereinbefore described and for the purpose of casting off from said needles the new loops which have been fed to them in the third feed.

The particular form of cam for the primary needles illustrated in Fig. 22 is used in the fourth feed at $D^3$, the pair of levers and the mechanism connected therewith for operating the presser and primary needle cam being omitted in the fourth feed.

The general operation of the machine hereinbefore specifically described is as follows: Assuming the machine to be knitting the regular work or one-and-one, the different pairs of levers and mechanisms connected thereto will be in the positions illustrated in Fig. 1. If it is desired to knit a royal or tuck stitch the pin 245 is moved to its uppermost position in its slot by means of the switch plate 241, which is inclined at the proper angle to force said pin 245 upwardly by the mechanism hereinbefore described actuated by the pattern wheel. Now, as the shipping stand is carried around by the secondary cylinder the pin 245 will operate in the first feed to change the levers 318 and 319 (Figs. 16 and 18) to withdraw the presser 335 from the secondary needles at D (Fig. 1), thus leaving the old loops on the secondary needles. At the second feed there are no levers to throw out the presser at D', so that the two loops are cast off the secondary needles, forming the royal or tuck stitch. At the third feed at $D^2$ the pair of levers are operated by the pin 245 to remove the presser from the secondary needles, and in the fourth feed the secondary needles are pressed at $D^3$ to cast off the two loops, thus forming the royal or tuck stitch. Having knit a number of courses of the royal or tuck stitch and assuming it to be desired to knit a slack course, which slack course is made on the first feed, the switch-plates are operated by the mechanism hereinbefore described through the pattern wheels to return the pin 245 to the bottom of its slot. The switch plate 240 is inclined at the proper angle to raise the pin 244 to the top of its slot and the shipping pin 246 will, therefore, be moved from its middle position (Fig. 6) to the bottom of its slot as in Fig. 8, it being noted that when the pin 244 is moved from its lowermost position to its uppermost position the lever 265 will be rocked and the slide 264 will be moved approximately twice the distance that the slide 259 moves, for the reason that the lever 265 is pivoted to multiply two to one from the slide 259 to the slide 264. It will be noted, however, that when the parts are in the position illustrated in Fig. 6 the slot 263 extends above the screw 261 and, therefore, the first half of the movement of the slide 264 has no effect upon the screw 261 and the slide 246', but in the latter half of the movement said slide 264 moves the pin 261 downwardly and, therefore, moves the slide 246' downwardly until the pin 246 is at the bottom of its slot 256. The different shipping pins are, therefore, now in the relative positions illustrated in Fig. 8 and as the needle cylinders rotate in the first feed, the pin 244 operates the lever 302 at C to rock the lever 309 in the proper direction to move the slur cock toward the needles to its farthermost point, thus giving a long throw to the sinkers and obtaining the long loop necessary for the slack course. The pin 245 operates at D in feed 1 the lever 318 to move the presser into connection with the secondary needles and the pin 244 operates the upper lever 316 at D (Figs. 16, 18 and 30) to throw the presser out and the primary needle cam down into the proper position to knit the slack course, while at E, feed 1, the pin 244 operates the levers to change the needle cams (Figs. 11, 12, 13 and 20) to leave the secondary needles up at the beginning of the second feed, with the shipping pins still in the same positions as in Fig. 8, and with the secondary needles drawn up out of action so that the yarn is not fed to them. The sinkers at C' are not changed, it being remembered that the upper set of levers 302 and 303 (Fig. 14) are omitted in this feed and the pin 246 in its lowermost position, so that it does not move the levers 304 and 305. The presser at D' is not connected with any levers and, therefore, is not affected by the shipping pins as they pass by it. At G, feed 2, the upper needle cam is raised to pull the slack course by the mechanism illustrated in Figs. 27 and 28. At B' there is no change of the levers, but the secondary needles are drawn down ready for the third feed, in position to knit one-and-one. The levers at D² are changed by the shipping pin 245 to allow the presser to be brought in and press the secondary needles. With this exception there is no change and a course of one-and-one is knit.

Between the third and fourth feeds the cam 381 is rotated through 60° by the pin 246 which engages the arm 385 and rotates said cam as it passes thereby, leaving the arm 386 in the position occupied by the arm 385 (Fig. 21). At the fourth feed nothing is changed and a one-and-one course is knit. As the shipping stand passes the cam 246² said cam will engage the pin 246 and move the same upwardly to its middle position, thus moving the slide 264 upwardly one-half of its entire throw and moving the pin 244 downwardly one-half its entire throw. When the shipping pin arrives opposite the switch plates, after the rotation hereinbefore described, the switch-plate 240 will then be in position to move the pin 244 to the bottom of its slot, thus moving the slide 259 and lever 265 to raise the slide 264 to the position illustrated in Fig. 6, it being noted that this latter movement of the slide 264 has no effect upon the screw 261 and pin 246, for the reason that the slot 263 is below the screw 261 and this latter movement of the slide 264 moves said slide until a portion of said slot is above the screw 261 without moving the screw and the slide to which it is attached, so that the pins are now in the position illustrated in Fig. 6, ready to change the different pairs of levers to knit one-and-one in all the feeds.

After the desired number of courses of one-and-one have been knit in the fabric the slack course is again knit, as hereinbefore described, in the first feed. In the second feed the single course of plain locking stitch is knit, as before described; in the third feed, a course of one-and-one is knit, the pin 246 being in its lowermost position, and between the third and fourth feeds the pin 246 engages the arm 386 and rotates said arm another one-sixth of a rotation, and at the end of this sixth of a rotation the screw 391 drops into the recess 383, thus allowing the presser 405 to be brought forward and press the primary needles to cast off their new loops. As soon as this is done the pull upon the fabric from the tension causes the one-and-one course, previously knit in the third feed, to ravel back to the locking course knit on the second feed. The fourth feed knits another one-and-one course. The shipping pins are then changed to knit a welt or plain stitch, the pin 246 being carried by its switch plate to the top, the pin 244 being at the bottom of its slot and the pin 245 at the bottom of its slot. After the welt has been knit the shipping pins are changed by the switch plate to knit one-and-one, thus looping the welt onto the course of one-and-one knit previous to the commencement of the knitting of the welt. The machine now continues to knit one-and-one as long as may be desired and the different operations are repeated at the desired time by the proper arrangement of the pins in the pattern wheel 207 and the teeth or projections upon the pattern chain 204.

In addition to the result obtained by the movement of the pins 246 and 244 through their connecting slides 259 and 264 and lever 265, hereinbefore described, it will be noted that a complete slack course, extending entirely around the fabric, may be knit whereas in the former arrangement of shipping pins and the operation of the same the slack course lacked an entire circuit of the fabric by approximately the distance between the shipping pins 244 and 246, for the reason that the pin 244 changes the needle cams to knit a slack course and the pin 246 changes the cams to knit a one-and-one course, thus resulting in less than a complete circuit of the fabric for the slack course, it being understood that the shipping pins are moved relatively to the series of levers operated thereby toward the right (Fig. 6). In the present construction the pin 244 operates the proper levers for the slack course in the first feed and said pin 244 also operates to change the levers to the one-and-one course which follows, so that there is no loss of space in the slack course, but said slack course will extend entirely around the fabric. It will be understood that any number of revolutions of the cylinders that may be desired can be made before the stitches are pressed off the primary needles to ravel back and form the plain section, and this is true regardless of the number of feeds.

While I have illustrated and described my invention as particularly applicable to a circular rib knitting machine with spring needles therein, it will be understood that, in so far as the invention pertains to a rib knitting machine in which mechanism is provided whereby the new and old loops may be cast off the primary needles in the same feed and the primary loops of the rib fabric allowed to run back to a locking course previously knit in the primary loops of the rib fabric, I do not wish to be understood as limiting my invention to a circular rib knitting machine, as the operation aforesaid, viz., casting off the old loops and subsequently the new loops in the same feed from the primary needles and allowing the primary loops to run back to a locking course previously knitted in the primary loops of a rib fabric, may be performed upon a flat knitting machine or upon a latch needle machine without departing from the spirit of my invention.

Having thus described my invention, what I claim and desire by Letters Patent to secure is:

1. In a circular rib knitting machine of the class described, two rotary needle cylinders, a set of needles adapted to slide in grooves provided in the periphery of each of said cylinders, respectively, a presser adapted to press the primary needles to cast off their old loops, and an auxiliary presser adapted to subsequently press said primary needles in the same feed to cast off their new loops, and means to automatically move said auxiliary presser into and out of engagement with said primary needles.

2. In a circular rib knitting machine of the class described, two rotary needle cylinders, a set of needles adapted to slide in grooves provided in the periphery of each of said cylinders, respectively, a presser adapted to press the primary needles to cast off their old loops, and an auxiliary presser adapted to subsequently press said primary needles in the same feed to cast off their new loops, a cam, and mechanism operated by said cam to move said auxiliary presser into and out of engagement with said primary needles.

3. In a circular rib knitting machine of the class described, two rotary needle cylinders, a set of needles adapted to slide in grooves provided in the periphery of each of said cylinders, respectively, a presser adapted to press the primary needles to cast off their old loops, and an auxiliary presser adapted to subsequently press said primary needles in the same feed to cast off their new loops, a cam, mechanism adapted to impart an intermittent rotary motion to said cam, and mechanism operated by said cam to move said auxiliary presser into and out of engagement with the primary set of needles.

4. In a circular rib knitting machine of the class described, two rotary needle cylinders, a set of needles adapted to slide in grooves provided in the periphery of each of said cylinders, respectively, a presser adapted to press the primary needles to cast off their old loops, and an auxiliary presser adapted to subsequently press said primary needles in the same feed to cast off their new loops, a cam, a plurality of radial arms upon said cam, mechanism adapted to engage said arms and impart an intermittent rotary motion to said cam, and mechanism operated by said cam adapted to move said auxiliary presser into and out of engagement with said primary needles.

5. In a circular rib knitting machine, two rotary needle cylinders, a set of needles adapted to slide in grooves provided in the peripheries of each of said cylinders, respectively, a presser for the primary set of needles, a cam, means carried by one of said needle cylinders adapted to impart an intermittent rotary motion to said cam, and mechanism operated by said cam adapted to move said presser into and out of engagement with the primary set of said needles.

6. In a circular rib knitting machine, two rotary needle cylinders, a set of needles adapted to slide in grooves provided in the peripheries of each of said cylinders, respectively, a presser for the primary set of needles, a cam, a plurality of arms upon said cam, means carried by one of said needle cylinders adapted to engage said arms and impart an intermittent rotary motion to said cam, and mechanism operated by said cam to move said presser into and out of engagement with the needles of the primary set of needles.

7. In a circular rib knitting machine, two rotary needle cylinders, a set of needles adapted to slide in grooves provided in the peripheries of each of said cylinders, respectively, a presser for the primary set of needles, a cam, a plurality of arms upon said cam, a shipping pin mounted upon the secondary needle cylinder adapted to engage said arms and impart an intermittent rotary motion to said cam, and mechanism operated by said cam adapted to move said presser into and out of engagement with the needles of the primary set of needles.

8. In a circular rib knitting machine, two rotary needle cylinders, a set of needles adapted to slide in grooves provided in the peripheries of each of said cylinders, respectively, a presser for the primary set of needles, a cam, a plurality of arms upon said cam, a shipping pin mounted upon the secondary needle cylinder, means to move said shipping pin into and out of alinement with said arms, whereby, when said cylinders are rotated, said cam may be intermittently rotated, and mechanism operated by said cam adapted to move said presser into and out of engagement with the needles of the primary set of needles.

9. In a circular rib knitting machine, two rotary needle cylinders, a set of needles adapted to slide in grooves provided in the peripheries of each of said cylinders, respectively, a presser for the primary set of needles, a cam, a plurality of arms upon said cam, the outer ends of said arms varying in in height, two shipping pins mounted upon the secondary needle cylinder at different heights, one of said pins adapted to engage the higher of said arms, the other of said pins adapted to engage the lower of said arms, whereby when said cylinders are rotated said cam may be intermittently rotated, and mechanism operated by said cam adapted to move said presser into and out of engagement with the needles of the primary set of needles.

10. In a circular rib knitting machine, two rotary needle cylinders, a set of needles adapted to slide in grooves provided in the peripheries of each of said cylinders, respectively, a presser for the primary set of needles, a cam, a plurality of arms upon said cam, the outer ends of said arms varying in height, two shipping pins mounted upon the secondary needle cylinder, and means to move said shipping pins into and out of alinement with said arms, whereby when said cylinders are rotated, an intermittent rotary motion may be imparted to said cam.

11. In a circular rib knitting machine, two rotary needle cylinders, a set of needles adapted to slide in grooves provided in the peripheries of each of said cylinders, respectively, a presser for the primary set of needles, a cam, a plurality of arms upon said cam, the outer ends of said arms varying in height, two shipping pins mounted upon the secondary needle cylinder, means to move said shipping pins into and out of alinement with said arms, whereby, when said cylinders are rotated, an intermittent rotary motion may be imparted to said cam, and mechanism operated by said cam adapted to move said presser into and out of engagement with the needles of the primary set of needles.

12. In a circular rib knitting machine of the class described, two rotary needle cylinders, a set of needles adapted to slide in grooves provided in the periphery of each of said cylinders, respectively, a presser adapted to press the primary needles to cast off their old loops, and an auxiliary presser adapted to subsequently press said primary needles in the same feed to cast off their new loops, a presser stand upon which said auxiliary presser is movably mounted, a spring acting to move said auxiliary presser toward said primary needles, a cam, and mechanism actuated by said cam to move said auxiliary presser out of engagement with the needles of the primary set of needles.

13. In a circular rib knitting machine of the class described, two rotary needle cylinders, a set of needles adapted to slide in grooves provided in the periphery of each of said cylinders, respectively, a presser adapted to press the primary needles to cast off their old loops, and an auxiliary presser adapted to subsequently press said primary needles in the same feed to cast off their new loops, a presser stand upon which said auxiliary presser is movably mounted, a spring acting to move said auxiliary presser toward said needles, a cam, mechanism adapted to impart an intermittent rotary motion to said cam, and mechanism actuated by said cam to move said auxiliary presser away from the needles of the primary set of needles.

14. In a circular rib knitting machine, two rotary needle cylinders, a set of needles adapted to slide in grooves provided in the peripheries of each of said cylinders, respectively, a presser for the primary set of needles, a cam, a plurality of arms upon said cam, a shipping pin mounted upon the secondary needle cylinder, a rotary pattern wheel, and mechanism actuated thereby to move said shipping pin into and out of alinement with said arms, whereby, when said cylinders are rotated, an intermittent rotary motion may be imparted to said cam.

15. In a circular rib knitting machine, two rotary needle cylinders, a set of needles adapted to slide in grooves provided in the peripheries of each of said cylinders, respectively, a presser for the primary set of needles, a cam, a plurality of arms upon said cam, the outer ends of said arms varying in height, two shipping pins mounted upon the secondary needle cylinder at different heights, one of said pins adapted to engage the higher of said arms, the other of said pins adapted to engage the lower of said arms, a rotary pattern wheel, and mechanism actuated thereby to move said shipping pins into and out of alinement with said arms, whereby, when said cylinders are rotated, an intermittent rotary motion may be imparted to said cam.

16. In a circular rib knitting machine, two needle cylinders, a set of needles adapted to slide in grooves provided in the periphery of each of said cylinders, respectively, two devices adapted to feed yarn successively to the primary set of needles, a primary presser adapted to press said primary needles to cast off their old loops, an auxiliary presser adapted to subsequently press said primary needles to cast off their new loops, said primary and auxiliary pressers interposed between said successive feeding devices, and cams adapted to impart a reciprocatory motion to said primary needles and move the beards of said primary needles into contact with said primary and auxiliary pressers.

17. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams, to change the stitch produced, and an auxiliary presser and needle cam for the primary needles adapted to press the beards of said primary needles a second time in the same feed, whereby both loops are cast off the primary needles for the purpose specified.

18. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams, to change the stitch produced, and an auxiliary presser and needle cam for the primary needles adapted to press the beards of said primary needles a second time in the same feed, whereby both loops are cast off the primary needles, and means to automatically move said auxiliary presser into and out of engagement with said primary needles.

19. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams to change the stitch produced, and an auxiliary presser and needle cam for the primary needles adapted to press the beards of said primary needles a second time in the same feed, whereby both loops are cast off the primary needles, a cam, and mechanism operated by said cam to move said auxiliary presser into and out of engagement with said primary needles.

20. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams to change the stitch produced, and an auxiliary presser and needle cam for the primary needles adapted to press the beards of said primary needles a second time in the same feed, whereby both loops are cast off the primary needles, a cam, and mechanism adapted to impart an intermittent rotary motion to said cam, and mechanism operated by said cam to move said auxiliary presser into and out of engagement with said primary needles.

21. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams, to change the stitch produced, and an auxiliary presser and needle cam for the primary needles adapted to press the beards of said primary needles a second time in the same feed, whereby both loops are cast off the primary needles, a cam, means carried by one of said needle cylinders adapted to impart an intermittent rotary motion to said cam, and mechanism operated by said cam adapted to move said auxiliary presser into and out of engagement with the needles of the primary set of needles.

22. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams to change the stitch produced, and an auxiliary presser and needle cam for the primary needles adapted to press the beards of said primary needles a second time in the same feed, whereby both loops are cast off the primary needles, a cam, a shipping pin carried by one of said needle cylinders adapted to engage projections upon said cam and impart an intermittent rotary motion thereto, and mechanism operated by said cam adapted to move said auxiliary presser into and out of engagement with the needles of the primary set of needles.

23. In a circular knitting machine two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams, to change the stitch produced, and an auxiliary presser and needle cam for the primary needles adapted to press the beards of said primary needles a second time in the same feed, whereby both loops are cast off the primary needles, a cam, a shipping pin carried by one of said needle cylinders adapted to engage projections upon said cam and impart an intermittent rotary motion thereto, mechanism operated by said cam to move said auxiliary presser into and out of engagement with the needles of the primary set of needles, and means to move said shipping pin into and out of alinement with said projections.

24. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams, to change the stitch produced, and an auxiliary presser and needle cam for the primary needles adapted to press the beards of said primary needles a second time in the same feed, whereby both loops are cast off the primary needles, a cam with projections thereon varying in height, two shipping pins mounted upon one of said needle cylinders at different heights, one of said pins adapted to engage the higher and the other the lower of said projections, means to move said pins into and out of alinement with said projections, respectively, whereby an intermittent rotary motion is imparted to said cam, and mechanism operated by said cam to move said auxiliary presser into and out of engagement with the needles of the primary set of needles.

25. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with means for automatically changing the positions of said slur cock, the presser for the secondary needles, and the needle cams to change the stitch produced, an auxiliary presser and needle cam for the primary needles adapted to press the beards of said primary needles a second time in the same feed, whereby both loops are cast off the primary needles, a cam with projections thereon varying in height, two shipping pins mounted upon one of said needle cylinders at different heights, one of said pins adapted to engage the higher and the other the lower of said projections, a rotary pattern wheel and mechanism actuated thereby to move said shipping pins into and out of alinement with said projections, respectively, whereby an intermittent rotary motion is imparted to said cam, and mechanism operated by said cam to move said auxiliary presser into and out of engagement with the needles of the primary set of said needles.

26. In a circular knitting machine, two needle cylinders, a set of needles adapted to slide in grooves provided in the periphery of each of said cylinders, respectively, and cams adapted to actuate said needles; in combination with two shipping pins movably mounted upon one of said cylinders, instrumentalities connecting said pins, whereby when one of said pins is moved in one direction the other will be moved in the opposite direction, switch devices for adjusting said pins automatically, and means controlled by said shipping pins to change the positions of said needle cams as and for the purposes set forth.

27. In a circular knitting machine, two needle cylinders, a set of needles adapted to slide in grooves provided in the periphery of each of said cylinders, respectively, and cams adapted to actuate said needles; in combination with two shipping pins movably mounted upon one of said cylinders, a lever pivotally mounted on said cylinder, two slides connected to said lever upon opposite sides of said pivot, one of said slides connected, respectively, to one of said pins, whereby when one of said pins is moved in one direction the other will be moved in the opposite direction, switch devices for adjusting said pins automatically, and means controlled by said shipping pins to change the positions of said needle cams as and for the purposes set forth.

28. In a circular knitting machine, two needle cylinders, a set of needles adapted to slide in grooves provided in the periphery of each of said cylinders, respectively, and cams adapted to actuate said needles; in combination with two shipping pins movably mounted upon one of said cylinders, a lever pivotally mounted on said cylinder, two slides connected to said lever upon opposite sides of its pivot, one of said slides rigidly connected to one of said pins, the other of said slides provided with a slot, and a connection rigidly fastened to the other of said pins and projecting through said slot, whereby said last named slide may be moved without moving its respective pin and vice versa, switch devices for adjusting said pins automatically, and means controlled by said shipping pins to change the positions of said needle cams as and for the purposes set forth.

29. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with two shipping pins movably mounted upon one of said cylinders, instrumentalities connecting said pins whereby when one of said pins is moved in one direction the other will be moved in the opposite direction, switch devices for adjusting said pins automatically, and means controlled by said shipping pins to change the positions of said slur cock, the presser for the secondary needles and said needle cams, as and for the purpose set forth.

30. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams; in combination with two shipping pins movably mounted upon one of said cylinders, instrumentalities connecting said pins whereby when one of said pins is moved in one direction the other will be moved in the opposite direction, a pattern wheel, switches controlled by said pattern wheel and controlling said pins, and a series of levers supported by a stationary part and controlled by said shipping pins, said levers connected with said slur cock, the presser for the secondary needles and the needle cams as and for the purpose set forth.

31. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, needle actuating cams, an auxiliary presser for the primary needles located between two successive yarn feeding devices; in combination with a plurality of shipping pins, switch devices for adjusting said pins automatically, and means controlled by said shipping pins to change the positions of said slur cock, the presser for the secondary needles, the needle cams, and the auxiliary presser for the primary needles.

32. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of needles, a cam plate, a slur cock, a presser for each set of needles, respectively, needle actuating cams, an auxiliary presser for the primary needles located between two successive yarn feeding devices; an auxiliary cam, and mechanism actuated by said auxiliary cam to move said auxiliary presser toward or away from said primary needles; in combination with a plurality of shipping pins, switch devices for adjusting said pins automatically, and means controlled by said shipping pins to change the positions of said slur cock, the presser for the secondary needles, the needle cams, said auxiliary cam, and the auxiliary presser for the primary needles.

33. In a circular knitting machine, a rotary needle cylinder, two shipping pins movably mounted upon said cylinder, a lever pivotally mounted on said cylinder, two slides connected to said lever upon opposite sides of its pivot, one of said slides rigidly connected to one of said pins the other of said slides provided with a slot and a connection rigidly fastened to the other of said pins and projecting through said slot, whereby said last named slide may be moved without moving its respective pin and vice versa, a cam supported upon a stationary part adapted to engage said last named shipping pin and change its position, and switch plates adapted to engage both of said pins and control their position.

34. In a circular knitting machine, a rotary needle cylinder, two shipping pins movably mounted upon said cylinder, a lever pivotally mounted on said cylinder, two slides connected to said lever upon opposite sides of its pivot, one of said slides rigidly connected to one of said pins the other of said slides provided with a slot and a connection rigidly fastened to the other of said pins and projecting through said slot, whereby said last named slide may be moved without moving its respective pin and vice versa, a cam supported upon a stationary part adapted to engage said last named shipping pin and change its position, switch plates adapted to engage both of said pins and control their position, a pattern wheel and mechanism actuated thereby adapted to actuate said switch plates.

35. In a circular knitting machine, two needle cylinders, a set of needles adapted to slide in grooves provided in the periphery of each of said cylinders, respectively, a rotary sinker wheel, sinkers adapted to slide in grooves provided in said sinker wheel and in and out between the needles of the primary set of said needles, a cam plate, a slur cock, a presser for each set of needles, respectively, and needle actuating cams, an auxiliary presser for the primary needles located between two successive yarn feeding devices; in combination with a series of levers supported by a stationary part of said machine and arranged in pairs adjacent to the secondary cylinder, and mechanism adapted to move said auxiliary presser into and out of engagement with said primary needles, mechanism operated by one of said pairs of levers for controlling the position of said slur cock, another mechanism operated by one of said pairs of levers for controlling the position of the presser for the secondary needles, another mechanism operated by one of said pairs of levers for controlling the position of the needle cams, shipping pins carried by one of said needle cylinders for operating said levers and said auxiliary presser mechanism, a pattern wheel, and switch plates controlled by said pattern wheel and operating said shipping pins, whereby said machines may be set to knit the regular course, the "royal rib", the slack course, and further to cast off all loops from the primary needles for the purpose set forth.

36. A rib knitting machine, having, in combination, a primary and a secondary set of needles, a presser adapted to press said primary needles to cast off their old loops, and an auxiliary presser adapted to subsequently press said primary needles in the same feed to cast off their new loops.

37. A rib knitting machine, having, in combination a primary and a secondary set of needles, a presser adapted to press said primary needles to cast off their old loops, an auxiliary presser adapted to subsequently press said primary needles in the same feed to cast off their new loops, and means to automatically move said auxiliary presser into and out of engagement with said primary needles.

38. A rib knitting machine having, in combination, a primary and a secondary set of needles and instrumentalities adapted to coöperate with said primary needles, whereby the old loops and subsequently the new loops may be cast therefrom in the same feed.

39. A rib knitting machine, having, in combination, a primary and a secondary set of needles, means to hold said secondary set of needles out of action while said primary set is knitting a locking course, means to throw said secondary set of needles into action with said primary needles while said locking course is still held by the primary needles, a presser adapted to press said primary needles to cast off their old loops, and an auxiliary presser adapted to subsequently press said primary needles in the same feed to cast off their new loops.

40. A rib knitting machine, having, in combination, a primary and a secondary set of needles, means to hold said secondary set of needles out of action while said primary set is knitting a locking course, means to throw said secondary set of needles into action with said primary needles while said locking course is still held by the primary needles, a presser adapted to press said primary needles to cast off their old loops, an auxiliary presser adapted to subsequently press said primary needles in the same feed to cast off their new loops, and means to automatically move said auxiliary presser.

41. A rib knitting machine, having, in combination, a primary and a secondary set of needles, means to hold said secondary set of needles out of action while said primary set is knitting a locking course, means to throw said secondary set of needles into action with said primary needles while said locking course is still held by the primary needles, and instrumentalities adapted to coöperate with said primary needles, whereby the old loops and subsequently the new loops may be cast therefrom in the same feed.

In testimony whereof I have hereunto set my hand in presence of two subscribing witnesses.

WILLIAM T. BARRATT.

Witnesses:
CHARLES S. KEHOE,
EARL A. SMITH.